United States Patent
Asai et al.

(10) Patent No.: US 9,535,825 B2
(45) Date of Patent: Jan. 3, 2017

(54) INFORMATION PROCESSING DEVICE AND INFORMATION PROCESSING METHOD

(71) Applicant: FUJITSU LIMITED, Kawasaki-shi (JP)

(72) Inventors: Tatsuya Asai, Kawasaki (JP); Takashi Katoh, Yokohama (JP); Hiroaki Morikawa, Kawasaki (JP); Shinichiro Tago, Shinagawa (JP); Hiroya Inakoshi, Tama (JP); Nobuhiro Yugami, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 159 days.

(21) Appl. No.: 13/735,173

(22) Filed: Jan. 7, 2013

(65) Prior Publication Data

US 2013/0227228 A1    Aug. 29, 2013

(30) Foreign Application Priority Data

Feb. 23, 2012    (JP) .................................. 2012-037497

(51) Int. Cl.
  *G06F 12/00* (2006.01)
  *G06Q 10/10* (2012.01)
  *G06Q 30/06* (2012.01)

(52) U.S. Cl.
  CPC ............... *G06F 12/00* (2013.01); *G06Q 10/10* (2013.01); *G06Q 30/06* (2013.01)

(58) Field of Classification Search
  CPC .......... G06F 12/00; G06O 10/10; G06O 30/06
  USPC ........................................................ 711/154
  See application file for complete search history.

(56) References Cited

U.S. PATENT DOCUMENTS

2011/0125805 A1 * 5/2011 Ostrovsky ............. G06F 9/5038
                                                        707/803

FOREIGN PATENT DOCUMENTS

JP    2010-238195    10/2010

OTHER PUBLICATIONS

Arvind Arasu et al., "The CQL continuous query language: semantic foundations and query execution", The VDLB Journal, 15(2), 2006, pp. 121-142.

* cited by examiner

*Primary Examiner* — Matthew Bradley
(74) *Attorney, Agent, or Firm* — Staas & Halsey LLP

(57) ABSTRACT

An information processing device includes a memory; and a processor that executes a program stored in the memory, wherein the processor executes an operation including: receiving first stream data and second stream data that each include a piece of reception data representing a set of a key and a numerical value, when detecting, from the second stream data, a piece of reception data with the same key as a key of a piece of reception data of the first stream data, obtaining a processing result by adding together numerical values of the pieces of reception data that have the same key, and storing the processing result in the memory.

10 Claims, 42 Drawing Sheets

INFORMATION PROCESSING DEVICE AND INFORMATION PROCESSING METHOD

CROSS-REFERENCE TO RELATED APPLICATION(S)

This application is based upon and claims the benefit of priority of the prior Japanese Patent Application No. 2012-037497, filed on Feb. 23, 2012, the entire contents of which are incorporated herein by reference.

FIELD

The embodiments discussed herein are related to an information processing device and an information processing method.

BACKGROUND

There is related art in which pieces of stream data, which each include a piece of reception data representing a set of a key and a numerical value within each of a plurality of windows (periods) delimited by certain intervals between a start time and an end time, are received from a plurality of shops and the pieces of stream data are combined.

The above-described related art will be described. Here, description will be given of the case of combining windows of stream data R and stream data S that are received from two different shops and obtaining data on a customer who made purchases in both shops over a certain period of time as well as the total cost of the purchases.

FIG. 30 illustrates related art. The stream data R includes windows R1, R2, R3, and R4. The stream data S includes windows S1, S2, S3, and S4. Each of the windows includes one or more pieces of reception data in which the name of a customer and the cost of a product that the customer purchased are associated with each other. For window conditions, both of the stream data R and the stream data S have a window width of 30 minutes and a start time of 10:00.

In the related art, the result obtained by combining windows that have been closed most recently of the stream data R and the stream data S is the current result set. For example, when the current time falls in the time range "10:30 to 11:00", the windows that have been closed most recently are window R1 and window S1. In a comparison of window R1 and window S1, a customer included in both of the stream data R and the stream data S is "Alice" and the total cost for "Alice" is 900. Hence, the result set for R1×S1 is "Alice, 900".

When the current time falls in the time range "11:00 to 11:30", windows that have been closed most recently are window R2 and window S2. In a comparison of window R2 and window S2, customers included in both the stream data R and the stream data S are "Henry" and "Caren". The total cost for "Henry" is "1600" and the total cost for "Caren" is "300". Hence, the result set for R2×S2 includes "Henry, 1600" and "Caren, 300".

When the current time falls in the time range "11:30 to 12:00", windows which have been closed most recently are the window R3 and the window S3. In a comparison of the window R3 and the window S3, a customer included in both the stream data R and the stream data S is "Dick" and the total cost for "Dick" is "700". Hence, the result set of R3×S3 is "Dick, 700".

Examples of related art include Japanese Laid-open Patent Publication No. 2010-238195 and A. Arasu et al. "The CQL continuous query language: semantic foundations and query execution", *VLDB Journal*, 15(2), pp. 121-142, 2006.

SUMMARY

According to an aspect of the invention, an information processing device includes a memory; and a processor that executes a program stored in the memory, wherein the processor executes an operation including: receiving first stream data and second stream data that each include a piece of reception data representing a set of a key and a numerical value, when detecting, from the second stream data, a piece of reception data with the same key as a key of a piece of reception data of the first stream data, obtaining a processing result by adding together numerical values of the pieces of reception data that have the same key, and storing the processing result in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of an information processing device, a computer-readable recording medium, and a information processing method that are discussed herein will be described in detail with reference to the accompanying drawings. The disclosure is not limited by the embodiments.

Figure 1:
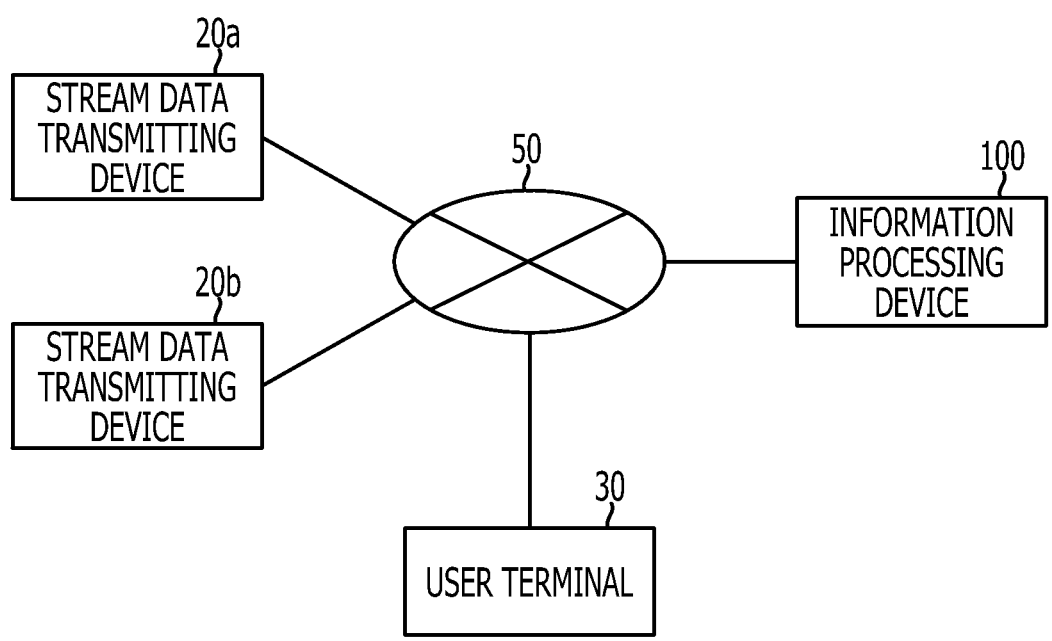
FIG. 1 illustrates an example of the configuration of a system according to an embodiment.

The configuration of a system according to an embodiment will be described. FIG. 1 illustrates an example of the configuration of a system according to the present embodiment. As illustrated in FIG. 1, the system includes stream data transmitting devices 20a and 20b, a user terminal 30, and an information processing device 100. The stream data transmitting devices 20a and 20b, the user terminal 30, and the information processing device 100 are coupled to a network 50. Hereinafter, when appropriate, the stream data transmitting devices 20a and 20b are collectively referred to as a stream data transmitting device 20.

The stream data transmitting device 20 is a device that transmits stream data to the information processing device 100. The stream data includes a piece of reception data representing a set for a key and a numerical value within each of a plurality of windows delimited by certain intervals between a start time and an end time. Hereinafter, stream data transmitted from the stream data transmitting device 20a is referred to as stream data R and stream data transmitted from the stream data transmitting device 20b is referred to as stream data S.

Figure 2:
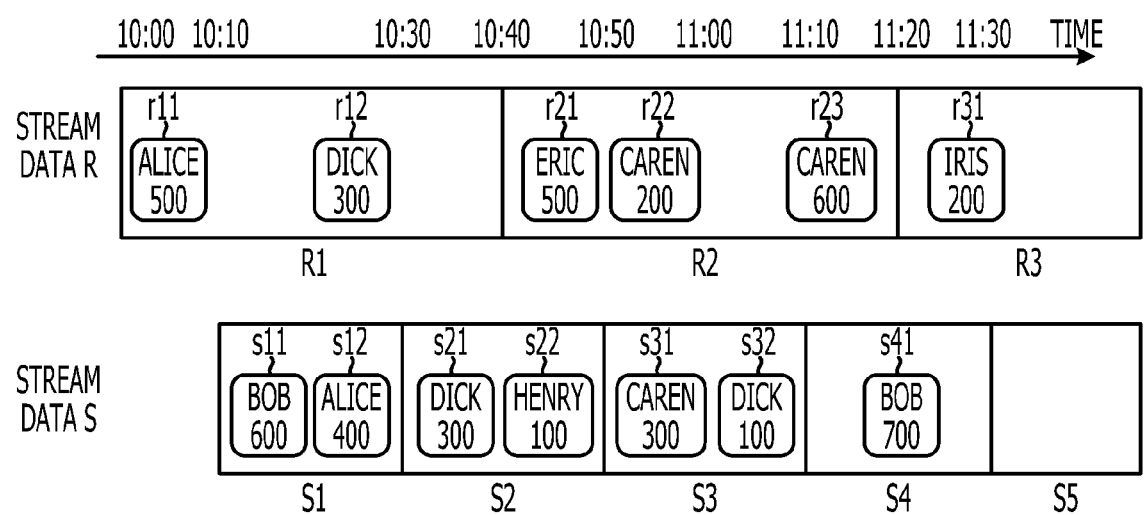
FIG. 2 illustrates an example of a data structure of stream data.

FIG. 2 illustrates an example of a data structure of stream data. First, the stream data R will be described. The stream data R includes windows R1, R2, and R3. The window width WR of each of the windows R1, R2, and R3 is 40 minutes. Each window of the stream data R includes reception data r. The reception data r includes a key and a numerical value.

The window R1 includes reception data r11 and r12. The reception data r11 includes the key "Alice" and the numerical value "500". The reception data r12 includes the key "Dick" and the numerical value "300".

The window R2 includes reception data r21 to r23. The reception data r21 includes the key "Eric" and the numerical value "500". The reception data r22 includes the key "Caren" and the numerical value "200". The reception data r23 includes the key "Caren" and the numerical value "600".

The window R3 includes reception data r31. The reception data r31 includes the key "Iris" and the numerical value "200".

For example, the stream data R is transmitted to the information processing device 100 by the stream data transmitting device 20a. The information processing device 100 starts receiving the stream data R from the time "10:00".

The stream data S in FIG. 2 will be described. The stream data S includes windows S1, S2, S3, S4, and S5. The window width WS of each of the windows S1 to S5 is 20 minutes. Each window of the stream data S includes reception data s. The reception data s includes a key and a numerical value.

The window S1 includes reception data s11 and s12. The reception data s11 includes the key "Bob" and the numerical value "600". The reception data s12 includes the key "Alice" and the numerical value "400".

The window S2 includes reception data s21 and s22. The reception data s21 includes the key "Dick" and the numerical value "300". The reception data s22 includes the key "Henry" and the numerical value "100".

The window S3 includes reception data s31 and s32. The reception data s31 includes the key "Caren" and the numerical value "300". The reception data s32 includes the key "Dick" and the numerical value "100".

The window S4 includes reception data s41. The reception data s41 includes the key "Bob" and the numerical value "700". The window S5 includes no reception data s.

For example, the stream data S is transmitted to the information processing device 100 by the stream data transmitting device 20b. The information processing device 100 starts receiving the stream data S from the time "10:10".

The user terminal 30 is a device that obtains a combined result of the stream data R and the stream data S that are illustrated in FIG. 2 from the information processing device 100.

The information processing device 100 is a device that sequentially receives the stream data R and the stream data S from the stream data transmitting devices 20a and 20b and that combines respective pieces of reception data included in the stream data R and the stream data S. The information processing device 100 transmits a combined result to the user terminal 30 in response to a request from the user terminal 30.

Figure 3:
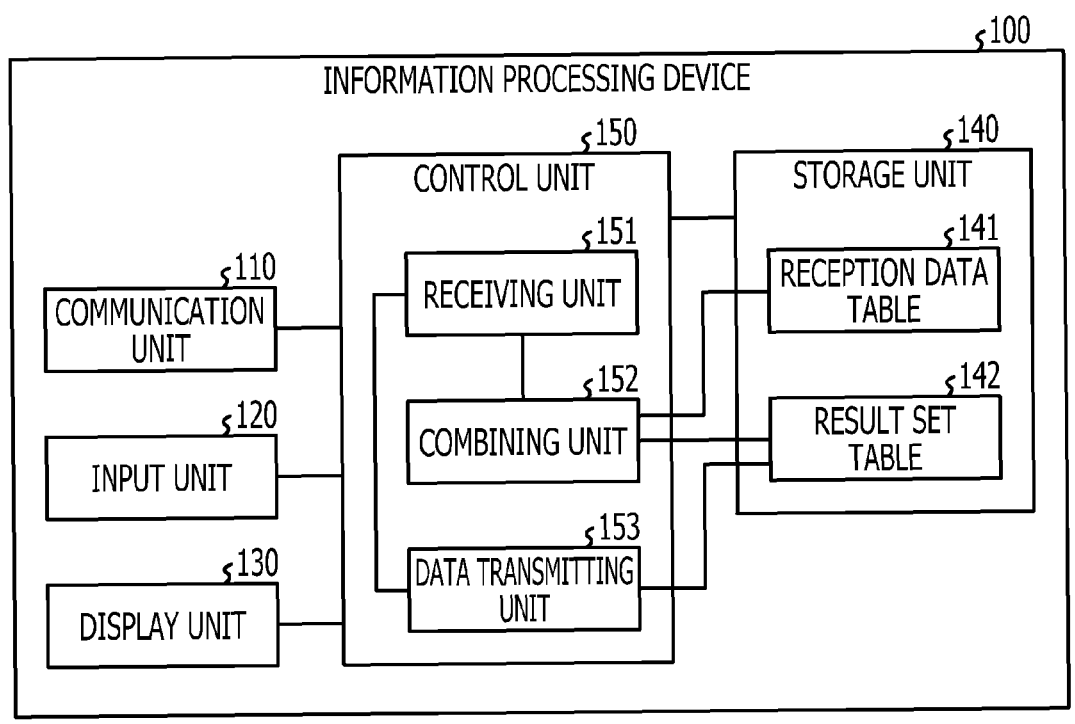
FIG. 3 illustrates an example of the configuration of an information processing device according to the embodiment.

The configuration of the information processing device 100 will be described. FIG. 3 illustrates an example of the configuration of the information processing device 100 according to the present embodiment. As illustrated in FIG. 3, the information processing device 100 includes a communication unit 110, an input unit 120, a display unit 130, a storage unit 140, and a control unit 150.

The communication unit 110 is a processing unit that performs data communication between the stream data transmitting devices 20a and 20b and the user terminal 30 via the network 50. The control unit 150 transmits and receives data between the stream data transmitting devices 20a and 20b and the user terminal 30 via the communication unit 110. The communication unit 110 corresponds to a communication device.

The input unit 120 is an input device with which various pieces of data are input into the information processing device 100. For example, the input unit 120 is an input device, such as a keyboard, a mouse, or a touch panel. The display unit 130 is a display device that displays various pieces of information. The display unit 130 is a display device, such as a display or a touch panel.

The storage unit 140 stores a reception data table 141 and a result set table 142. The storage unit 140 is a semiconductor memory device, such as a random access memory (RAM), a read only memory (ROM), or a flash memory, or a storage device, such as a hard disk or an optical disc.

Figure 4:
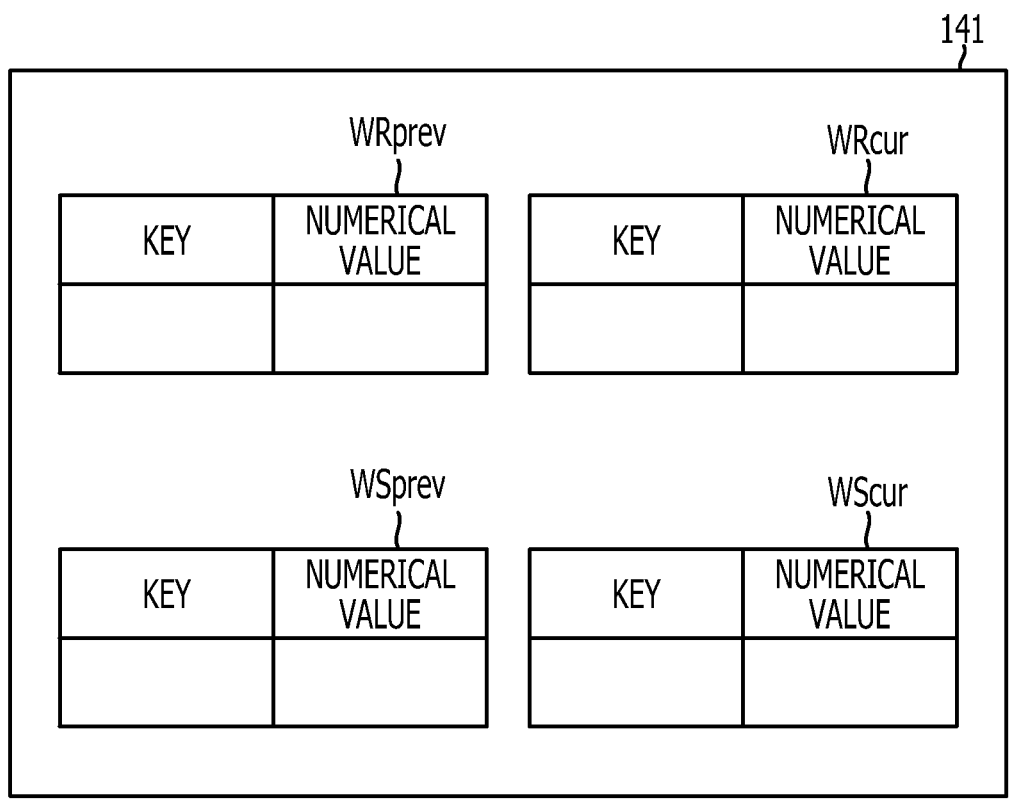
FIG. 4 illustrates an example of a data structure of a reception data table.

The reception data table 141 is a table that temporarily stores reception data included in stream data. FIG. 4 illustrates an example of a data structure of the reception data table 141. As illustrated in FIG. 4, the reception data table 141 includes storage areas WRprev, WRcur, WSprev, and WScur.

In the following description, terms for windows: "Rcur", "Rprev", "Scur", and "Sprev" are used. The window Rcur represents the window in the stream data R that is currently being received. The window Rprev represents the window immediately previous to the window Rcur in the stream data R. The window Scur represents the window in the stream data S that is currently being received. The window Sprev represents the window immediately previous to the window Scur in the stream data S.

"WRprev" is an area for storing reception data that is included in the window Rprev in the stream data R. For example, in FIG. 2, when the window Rprev is the window R1, the reception data r11 and r12 in the window R1 are stored in WRprev.

"WRcur" is an area for storing reception data included in the window Rcur in the stream data R. For example, in FIG. 2, when the window Rcur is the window R2, the reception data r21, r22, and r23 in the window R2 are to be stored in WRcur.

"WSprev" is an area for storing reception data that is included in the window Sprev in the stream data S. For example, in FIG. 2, when the window Sprev is the window S1, the reception data s11 and s12 in the window S1 are stored in WSprev.

"WScur" is an area for storing reception data included in the window Scur in the stream data S. For example, in FIG. 2, when the window Scur is the window S2, the reception data s21 and s22 in the window S2 are to be stored in WScur.

Figure 5:
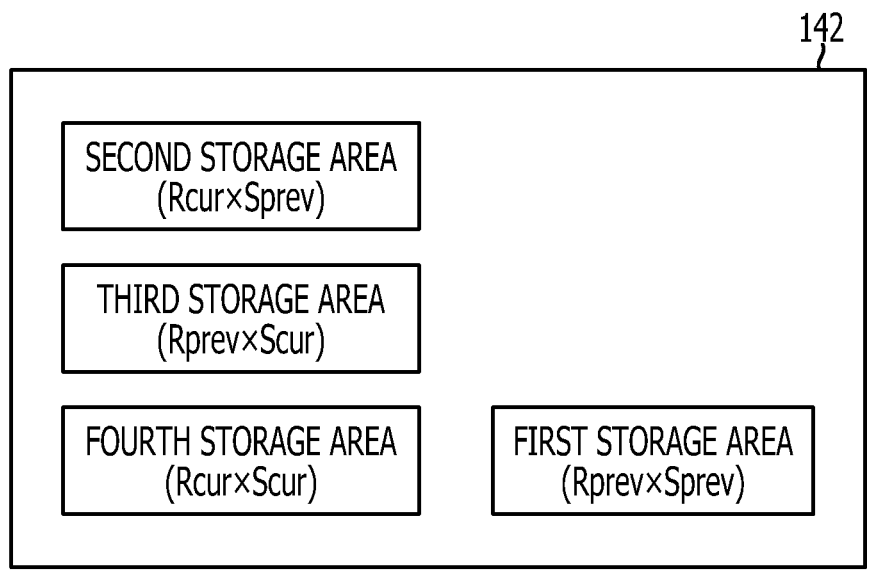
FIG. 5 illustrates an example of a data structure of a result set table.

The result set table 142 is a table that stores a combined result of the stream data R and the stream data S. FIG. 5 illustrates an example of a data structure of the result set table 142. As illustrated in FIG. 5, the result set table 142 includes a first storage area, a second storage area, a third storage area, and a fourth storage area.

The first storage area is an area for storing keys for pieces of reception data included in the window Rprev and the window Sprev as well as the total value of numerical values corresponding to the keys.

The second storage area is an area for storing keys of pieces of reception data included in the window Rcur and the window Sprev as well as the total value of numerical values corresponding to the keys.

The third storage area is an area for storing keys of pieces of reception data included in the window Rprev and the window Scur as well as the total value of numerical values corresponding to the keys.

The fourth storage area is an area for storing keys of pieces of reception data included in the window Rcur and the window Scur as well as the total value of numerical values corresponding to the keys.

The control unit 150 includes a receiving unit 151, a combining unit 152, and a data transmitting unit 153. The control unit 150 is an electronic circuit, such as an application specific integrated circuit (ASIC) or a field programmable gate array (FPGA). The control unit 150 is a processor, such as a central processing unit (CPU) or a microprocessing unit (MPU).

The receiving unit 151 is a processing unit that receives the stream data R and the stream data S. The receiving unit 151 generates closing signal stream data C as described below, while receiving the stream data R and the stream data S. The receiving unit 151 outputs the stream data R, the stream data S, and the closing signal stream data C to the combining unit 152.

The receiving unit 151 has two timers that, while comparing a current time to the window widths WR and WS, generates closing signal stream data C representing when windows of the stream data R and the stream data S are to be closed and outputs the closing signal stream data C to the combining unit 152. A signal of when to close the window of the stream data R is represented as "cr". A signal of when to close the window of the stream data S is represented as "cs". The receiving unit 151 may obtain information on the window widths WR and WS in advance from the stream data transmitting devices 20a and 20b or may obtain the information together with the stream data R and the stream data S.

Figure 6:
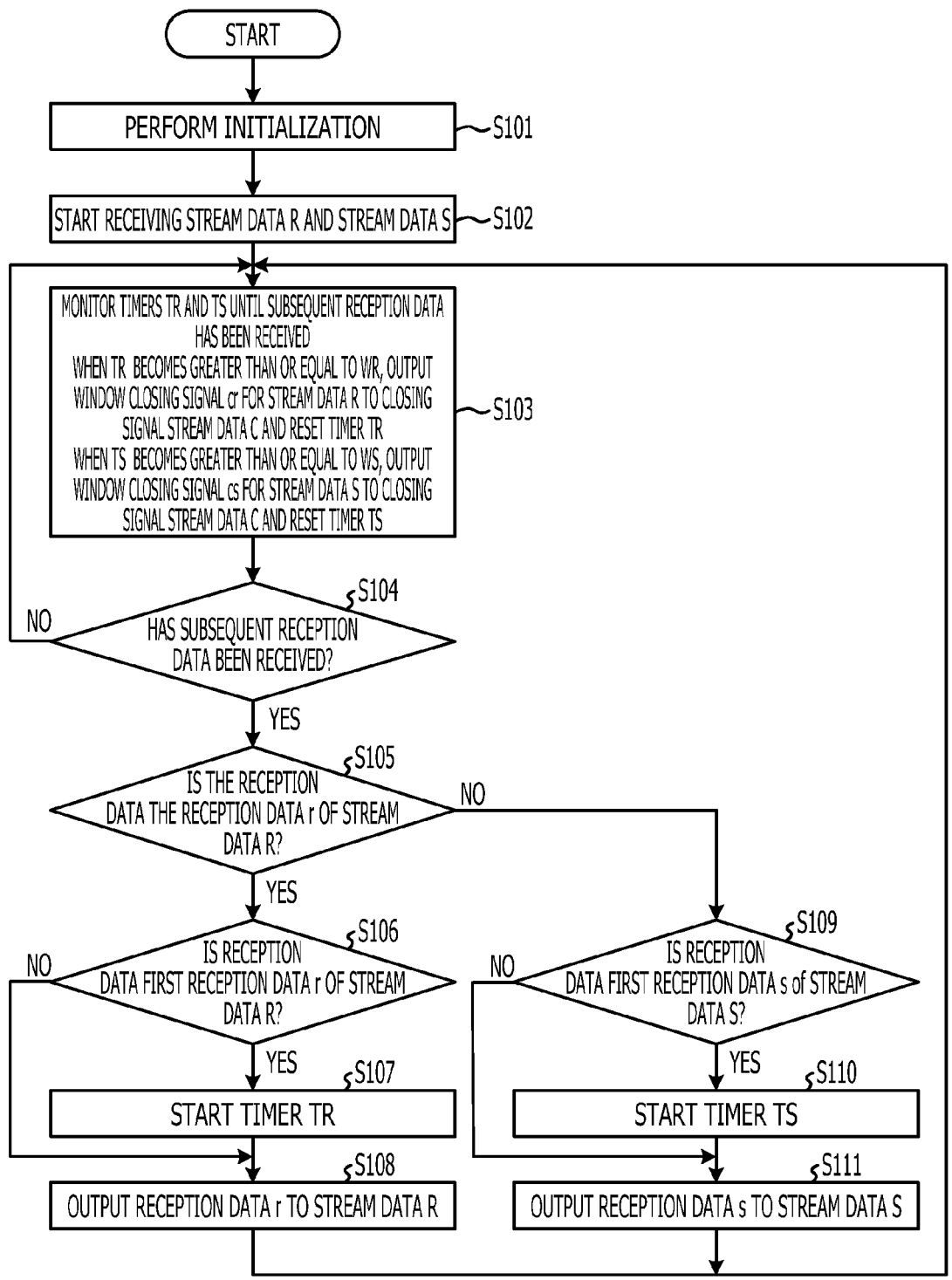
FIG. 6 is a flowchart illustrating a process of a receiving unit according to the embodiment.

Here, a process of the receiving unit 151 will be described. FIG. 6 is a flowchart illustrating a process of the receiving unit 151 according to the present embodiment. For example, processing illustrated in FIG. 6 is performed after the stream data R and the stream data S has been received.

The receiving unit 151 performs initialization in S101. In S101, the receiving unit 151 sets values of timers TR and TS to 0. The timer TR is a timer that measures the amount of time from the start time of a window of the stream data R. The timer TS is a timer that measures the amount of time from the start time of a window of the stream data S. The timer TR and the timer TS are in a stop state.

The receiving unit 151 starts receiving the stream data R and the stream data S in S102.

In S103, until subsequent reception data is received, the receiving unit 151 monitors the timers TR and TS. When TR≥WR, the receiving unit 151 outputs a window closing signal cr, which is for the stream data R, to closing signal stream data C and resets the timer TR. When TS≥WS, the receiving unit 151 outputs a window closing signal cs, which is for the stream data S, to the closing signal stream data C and resets the timer TS.

The receiving unit 151 determines whether the receiving unit 151 has received subsequent reception data in S104. When the receiving unit 151 has not received subsequent reception data (No in S104), the receiving unit 151 returns to S103.

Conversely, when the receiving unit 151 has received subsequent reception data (Yes in S104), the receiving unit 151 determines whether the reception data is reception data r from the stream data R in S105.

When the reception data is the reception data r (Yes in S105), the receiving unit 151 determines whether the reception data r is the first reception data r of the stream data R in S106. When the reception data r is not the first reception data r (No in S106), the receiving unit 151 proceeds to S108.

When the reception data r is the first reception data r (Yes in S106), the receiving unit 151 starts the timer TR in S107. The receiving unit 151 outputs the reception data r to the stream data R in S108 and returns to S103.

In S105, when the reception data is reception data s (No in S105), the receiving unit 151 determines whether the reception data s is the first reception data s of the stream data S in S109. When the reception data s is not the first reception data s (No in S109), the receiving unit 151 proceeds to S111.

When the reception data s is the first reception data s (Yes in S109), the receiving unit 151 starts the timer TS in S110. The receiving unit 151 outputs the reception data s to the stream data S in S111 and returns to S103.

While sequentially receiving windows of the stream data R and the stream data S from a start time, the combining unit 152 detects, from the stream data S, the same key as the key of a piece of reception data of the stream data R. The combining unit 152 calculates the total value for a key by adding the numerical values with the same key in the stream data R and the stream data S together.

Figure 7:
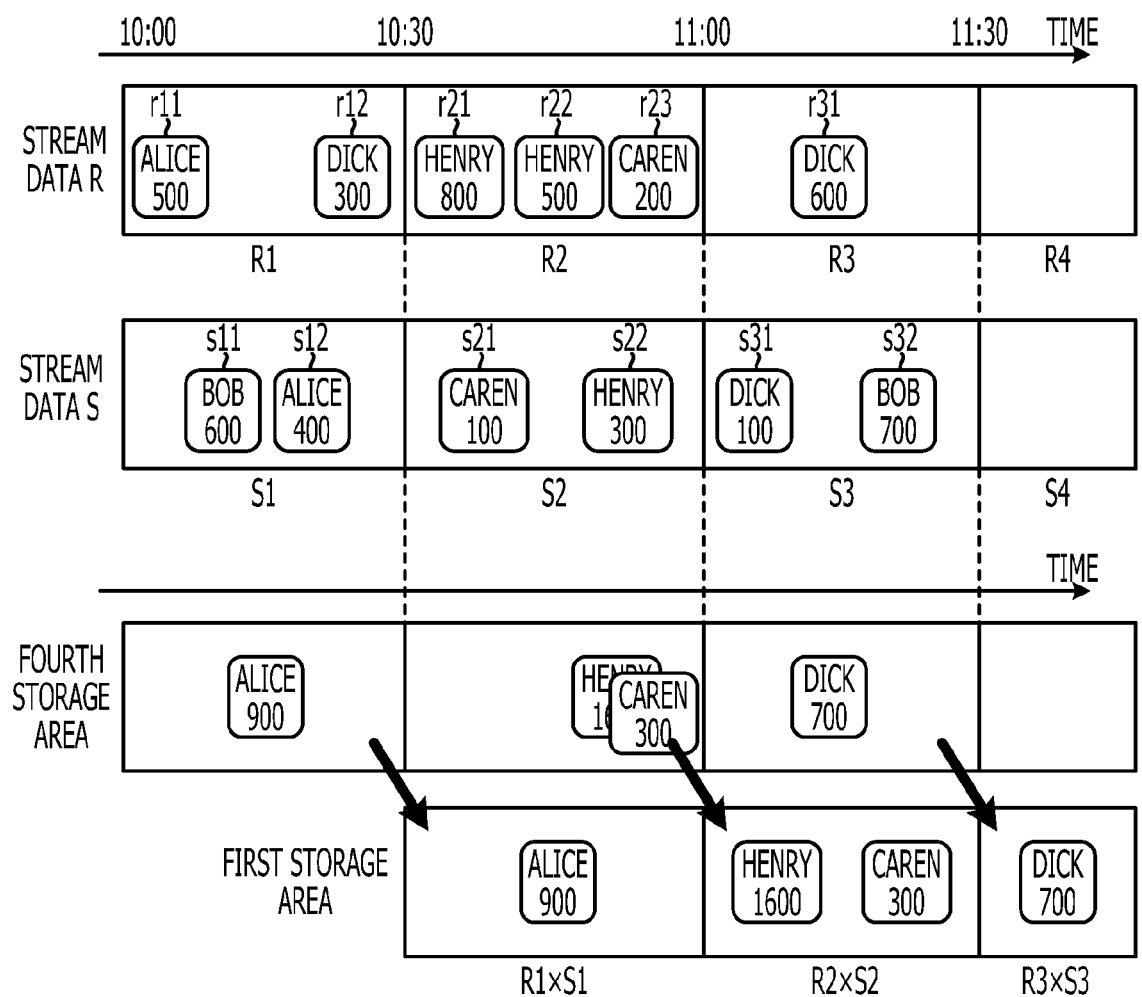
FIG. 7 is a diagram illustrating processing of a combining unit for when window widths are equal.

Here, processing of the combining unit 152 will be specifically described. First, processing of the combining unit 152 for when window widths of the stream data R and the stream data S are equal will be described. FIG. 7 is a diagram illustrating processing of the combining unit 152 for when window widths are equal.

The combining unit 152 sequentially registers reception data r included in the stream data R and sequentially registers reception data s included in the stream data S in the reception data table 141. The combining unit 152 compares each of the reception tables of the reception data table 141. When the combining unit 152 detects, from the stream data S, the same key as a key of the reception data r of the stream data R, the combining unit 152 registers the key and the total value corresponding thereto in the fourth storage area. Then, when windows are switched to subsequent windows, the combining unit 152 moves information in the fourth storage area to the first storage area. The information stored in the first storage area is a result set for previous windows.

Suppose that the current windows of the stream data R and the stream data S are R1 and S1 respectively. The keys of reception data r11 and reception data s12 have a match with "Alice". Thus, the combining unit 152 registers a set for the key "Alice" and the total value "900" in the fourth storage area.

Suppose that the current windows of the stream data R and the stream data S are R2 and S2. The combining unit 152 moves the set for the key "Alice" and the total value "900", which are registered in the fourth storage area, to the first storage area. The set for the key "Alice" and the total value "900" stored in the first storage area becomes a result set at the time "10:30".

When current windows of the stream data R and the stream data S are respectively R2 and S2, the keys of reception data r21, reception data r22, and reception data s22 have a match with "Henry". The keys of reception data r23 and reception data s21 have a match with "Caren". Thus, the combining unit 152 registers a set for the key "Henry" and the total value "1600" as well as a set for the key "Caren" and the total value "300" in the fourth storage area.

Suppose that the current windows of the stream data R and the stream data S are respectively R3 and S3. The combining unit 152 moves the set for the key "Henry" and the total value "1600" as well as the set for the key "Caren" and the total value "300", which have been registered in the fourth storage area, to the first storage area. The set for the key "Henry" and the total value "1600" as well as the set for the key "Caren" and the total value "300", which are stored in the first storage area, are result sets at the time "11:00".

When the current windows of the stream data R and the stream data S are respectively R3 and S3, the keys of reception data r31 and reception data s31 have a match with "Dick". Thus, the combining unit 152 registers a set for the key "Dick" and the total value "700" in the fourth storage area.

Suppose that the windows of the stream data R and the stream data S are R4 and S4. The combining unit 152 moves the set for the key "Dick" and the total value "700", which are registered in the fourth storage area, to the first storage area. The set for the key "Dick" and the total value "700" stored in the first storage area is a result set at the time "11:30".

Next, processing of the combining unit 152 for when window widths of the stream data R and the stream data S are different from each other will be described. A process of the combining unit 152 will be described. The process described below may also be employed when window widths are equal.

Figure 8:
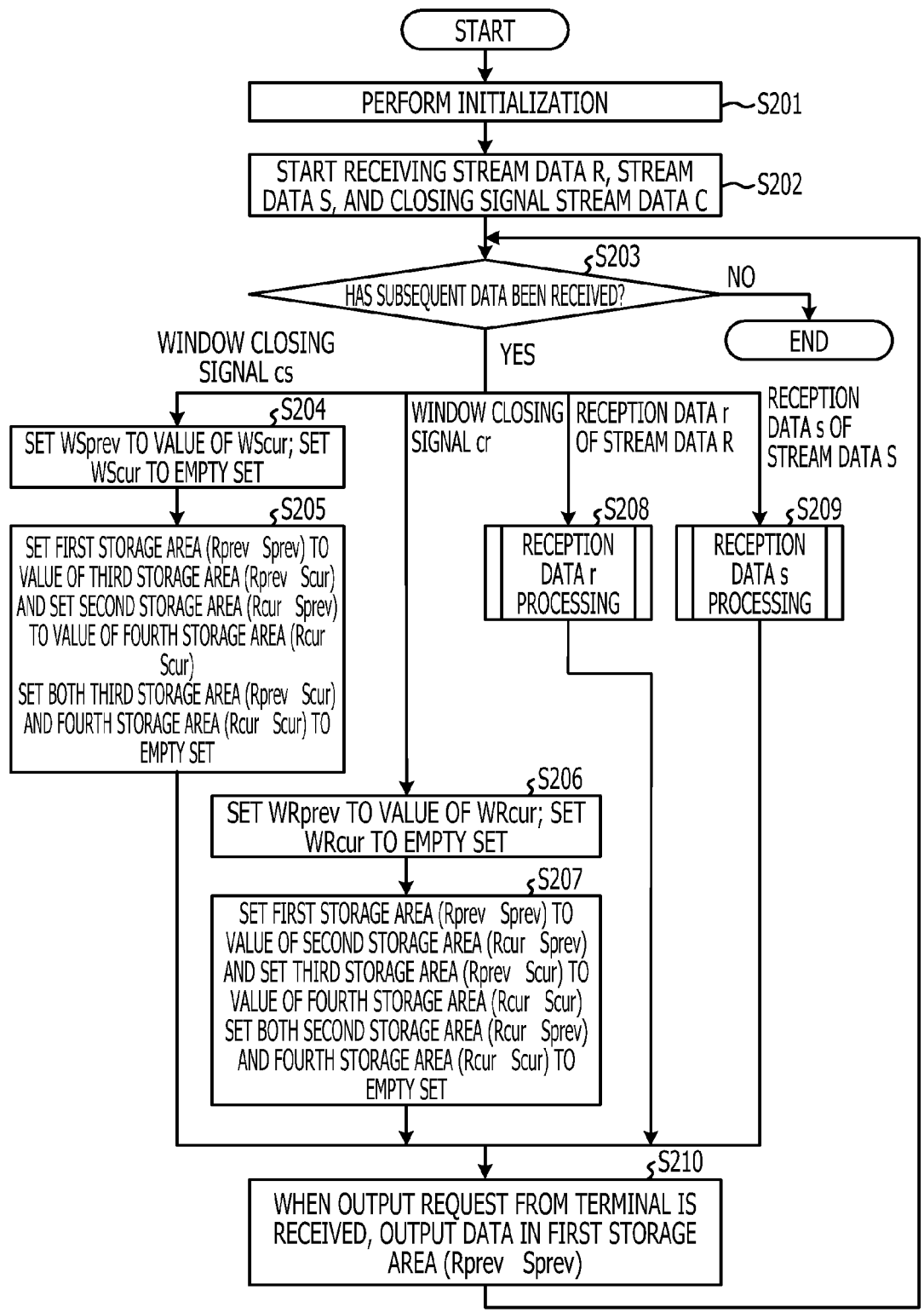
FIG. 8 is a flowchart illustrating a process of the combining unit according to the embodiment.

FIG. 8 is a flowchart illustrating a process of the combining unit 152 according to the present embodiment. For example, processing illustrated in FIG. 8 is performed after the stream data R, the stream data S, and closing signal stream data C has been received.

The combining unit 152 performs initialization in S201. In S201, the combining unit 152 sets WRprev, WRcur, WSprev, and WScur of the reception data table 141 to be an empty set. The combining unit 152 sets the first storage area, the second storage area, the third storage area, and the fourth storage area of the result set table 142 to have no information.

The combining unit 152 starts receiving the stream data R, the stream data S, and the closing signal stream data C in S202.

When the combining unit 152 has not received subsequent data for a given period of time or more (No in S203), the combining unit 152 ends the process.

In S203, when the combining unit 152 receives a window closing signal cs, the combining unit 152 proceeds to S204. When the combining unit 152 receives a window closing signal cr, the combining unit 152 proceeds to S206. When the combining unit 152 receives reception data r of the stream data R, the combining unit 152 proceeds to S208. When the combining unit 152 receives reception data s of the stream data S, the combining unit 152 proceeds to S209.

The case where the combining unit 152 receives a window closing signal cs will be described. The combining unit 152 sets, in the reception data table 141, WSprev to the value of WScur, and sets WScur to be an empty set in S204.

In S205, the combining unit 152 sets the first storage area (Rprev×Sprev) to be the value of the third storage area (Rprev×Scur), and sets the second storage area (Rcur×Sprev) to be the value of the fourth storage area (Rcur×Scur). The combining unit 152 sets both the third storage area (Rprev×Scur) and the fourth storage area (Rcur×Scur) to be an empty set, and then proceeds to S210.

The case where the combining unit 152 receives a window closing signal cr will be described. The combining unit 152 sets, in the reception data table 141, WRprev to be the value of WRcur, and sets WRcur to be an empty set in S206.

In S207, the combining unit 152 sets the first storage area (Rprev×Sprev) to be the value of the second storage area (Rcur×Sprev) and sets the third storage area to be the value of the fourth storage area (Rcur×Scur). The combining unit 152 sets both the second storage area (Rcur×Sprev) and the fourth storage area (Rcur×Scur) to be an empty set, and then proceeds to S210.

The case where the combining unit 152 receives reception data r of the stream data R will be described. The combining unit 152 performs reception data r processing in S208, and then proceeds to S210.

The case where the combining unit 152 receives reception data s of the stream data S will be described. The combining unit 152 performs reception data s processing in S209, and then proceeds to S210.

When the combining unit 152 receives an output request from the user terminal 30, the combining unit 152 outputs data that is in the first storage area (Rprev×Sprev) to the user terminal 30 in S210, and then returns to S203.

Figure 9:
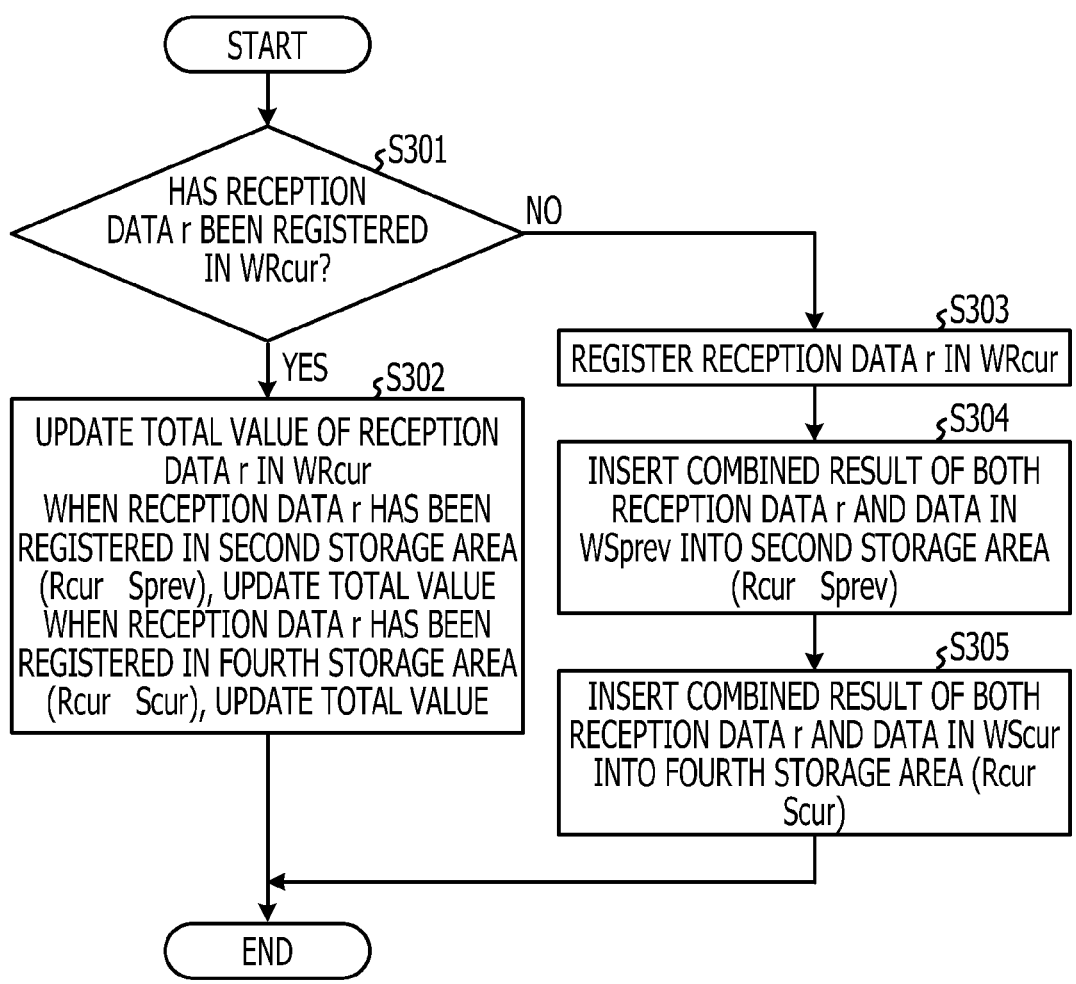
FIG. 9 is a flowchart illustrating a procedure for reception data r processing according to the embodiment.

Next, the procedure for the reception data r processing performed in S208 in FIG. 8 will be described. FIG. 9 is a flowchart illustrating the procedure for the reception data r processing according to the present embodiment.

As illustrated in FIG. 9, the combining unit 152 determines whether reception data r has been registered in WRcur in S301.

When the reception data r has been registered in WRcur (Yes in S301), the combining unit 152 proceeds to S302.

In S302, the combining unit 152 updates the total value of the reception data r in WRcur. When the reception data r has been registered in the second storage area (Rcur×Sprev), the combining unit 152 updates the total value. When the reception data r has been registered in the fourth storage area (Rcur×Scur), the combining unit 152 updates the total value.

Conversely, when the reception data r has not been registered in WRcur (No in S301), the combining unit 152 registers the reception data r in WRcur in S303.

The combining unit 152 inserts a combined result of both the reception data r and the data in WSprev into the second storage area (Rcur×Sprev) in S304. The combining unit 152 inserts a combined result of both the reception data r and the data in WScur into the fourth storage area (Rcur×Scur) in S305.

Figure 10:
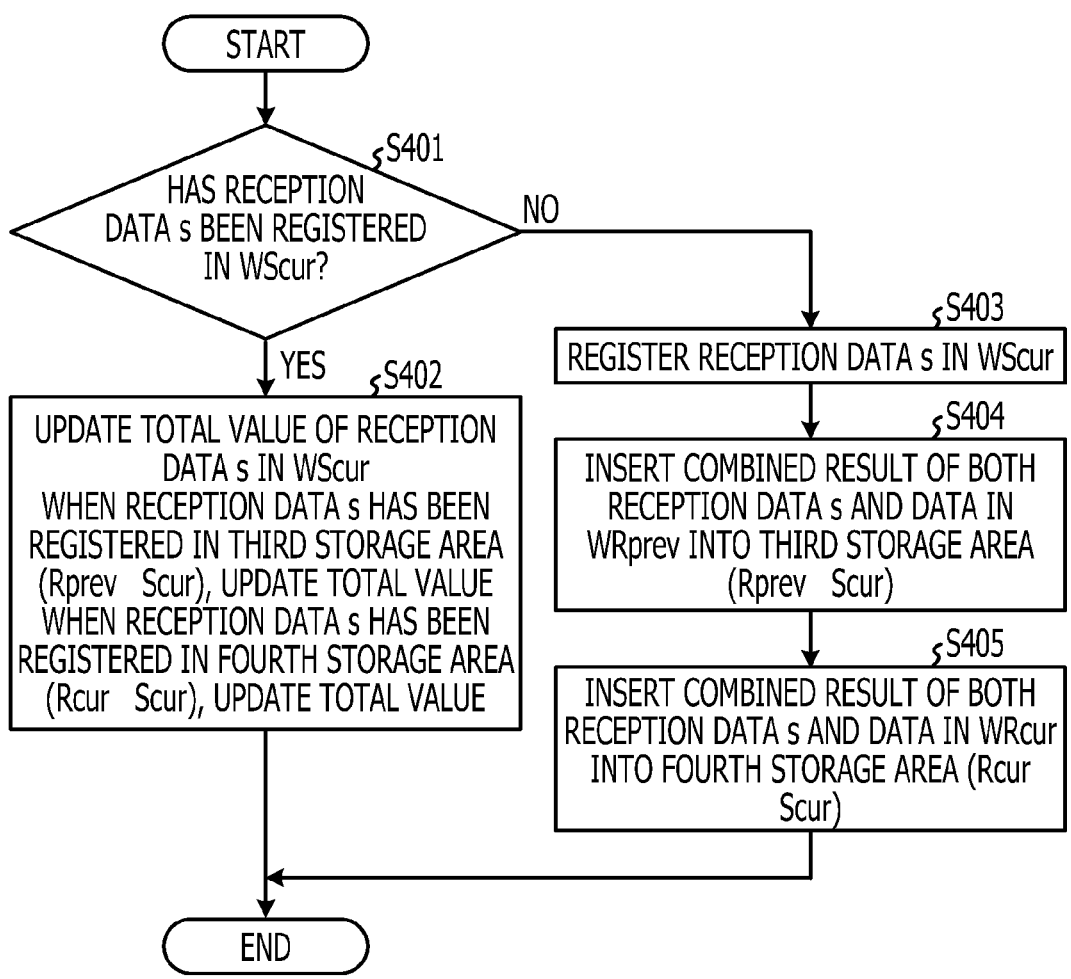
FIG. 10 is a flowchart illustrating a procedure for reception data s processing according to the embodiment.

Next, the procedure for the reception data s processing performed in S209 in FIG. 8 will be described. FIG. 10 is a flowchart illustrating a procedure of the reception data s processing according to the present embodiment.

As illustrated in FIG. 10, the combining unit 152 determines whether reception data s has been registered in WScur in S401.

When the reception data s has been registered in WScur (Yes in S401), the combining unit 152 proceeds to S402.

In S402, the combining unit 152 updates the total value of the reception data s in WScur. When the reception data s has been registered in the third storage area (Rprev×Scur), the combining unit 152 updates the total value. When the reception data s has been registered in the fourth storage area (Rcur×Scur), the combining unit 152 updates the total value.

Conversely, when the reception data s has not been registered in WScur (No in S401), the combining unit 152 registers the reception data s in WScur in S403.

The combining unit 152 inserts a combined result of the reception data s and data in WRprev into the third storage area (Rprev×Scur) in S404. The combining unit 152 inserts a combined result of the reception data s and data in WRcur into the fourth storage area (Rcur×Scur) in S405.

Processing of the combining unit 152 based on the process in FIGS. 8, 9, and 10 will be described. FIGS. 11A to 28B are diagrams illustrating processing of the combining unit 152. As preconditions, the window width WR of stream data R is presumed to be 40 minutes and a window width WS of stream data S is presumed to be 20 minutes.

Figure 11A:
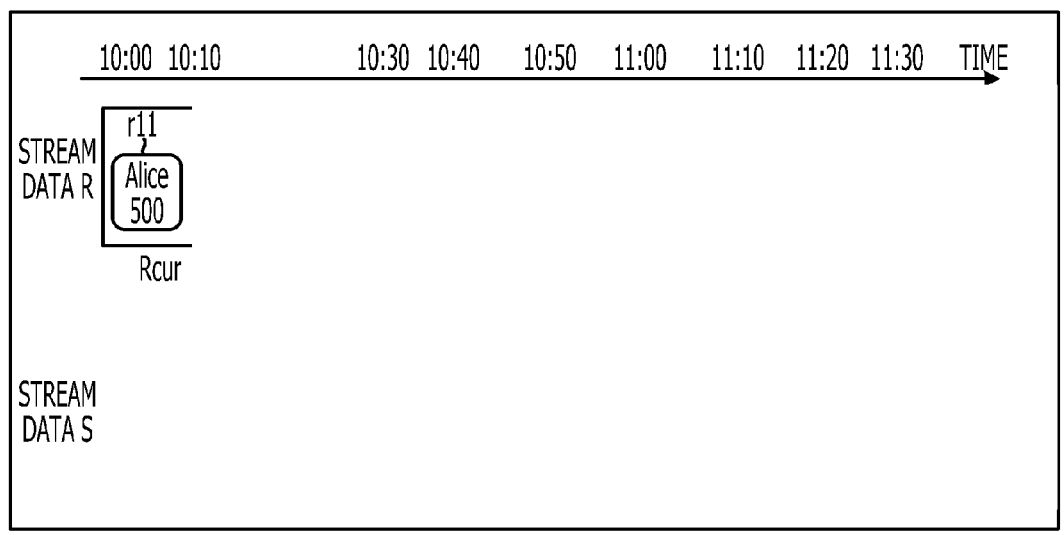
FIG. 11A is a diagram (1) illustrating processing of the combining unit.
Figure 11B:
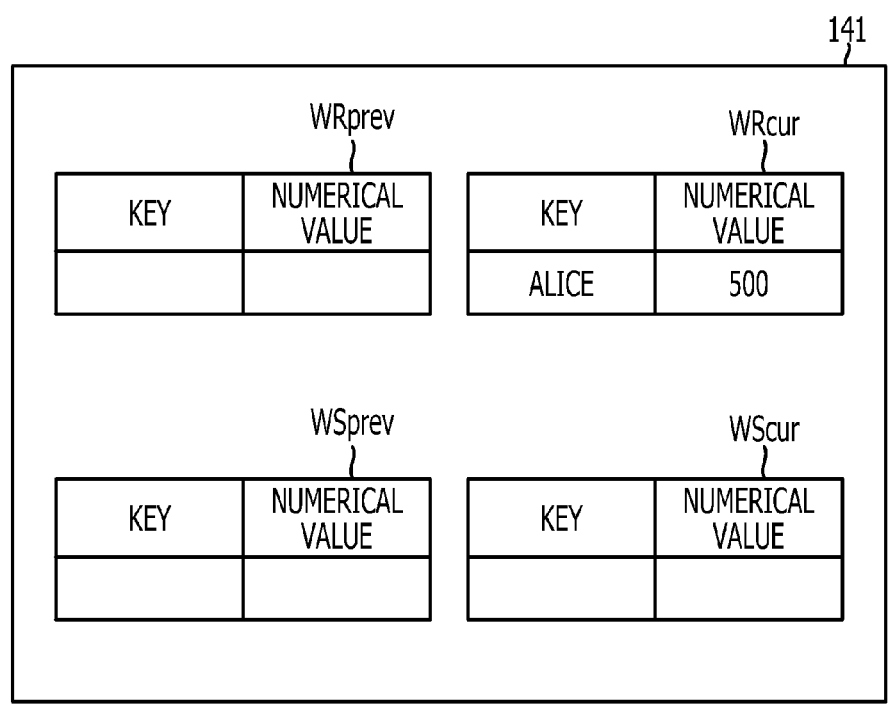
FIG. 11B is a diagram (2) illustrating processing of the combining unit.
Figure 11C:
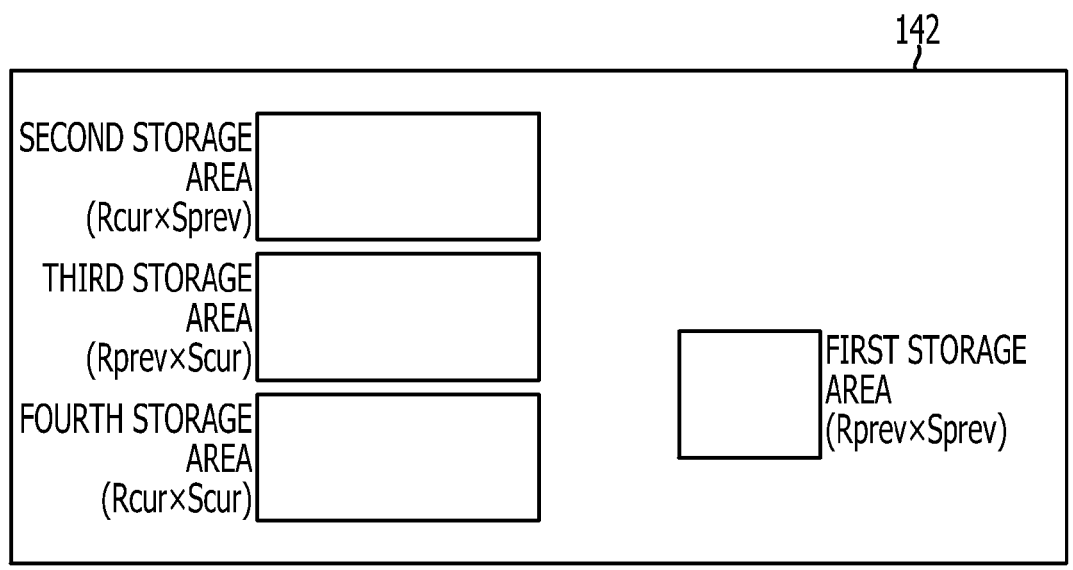
FIG. 11C is a diagram (3) illustrating processing of the combining unit.

FIGS. 11A, 11B, and 11C will be described. Here the current time is "10:00". As illustrated in FIG. 11A, the combining unit 152 starts receiving the stream data R. The stream data R includes reception data r11. The combining unit 152 registers the key "Alice" and the numerical value "500" of the reception data r11 in WRcur of the reception data table 141. As illustrated in FIG. 11B, the key "Alice" and the numerical value "500" are registered in WRcur of the reception data table 141. As illustrated in FIG. 11B, because WScur and WSprev, which are to be compared with the reception data r11, have no data, there are no combined results. Thus, as illustrated in FIG. 11C, the combining unit 152 does not register any data in the first to fourth storage areas.

At the current time of "10:00", after the receiving unit 151 sets the timer TR to 0, the timer TR starts. Conversely, because the stream data S has not started being received, the timer TS is yet to start.

Figure 12A:
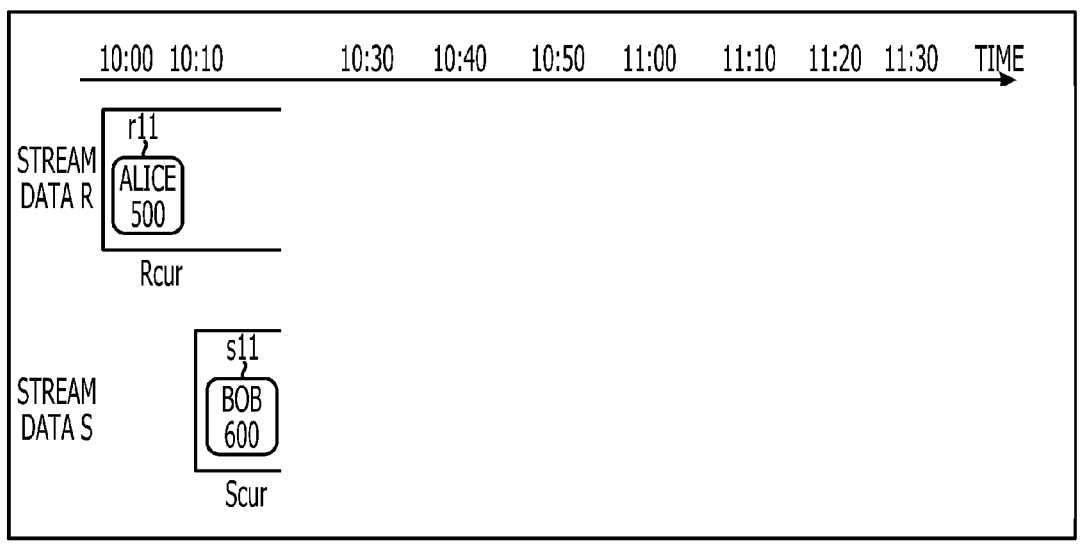
FIG. 12A is a diagram (4) illustrating processing of the combining unit.
Figure 12B:
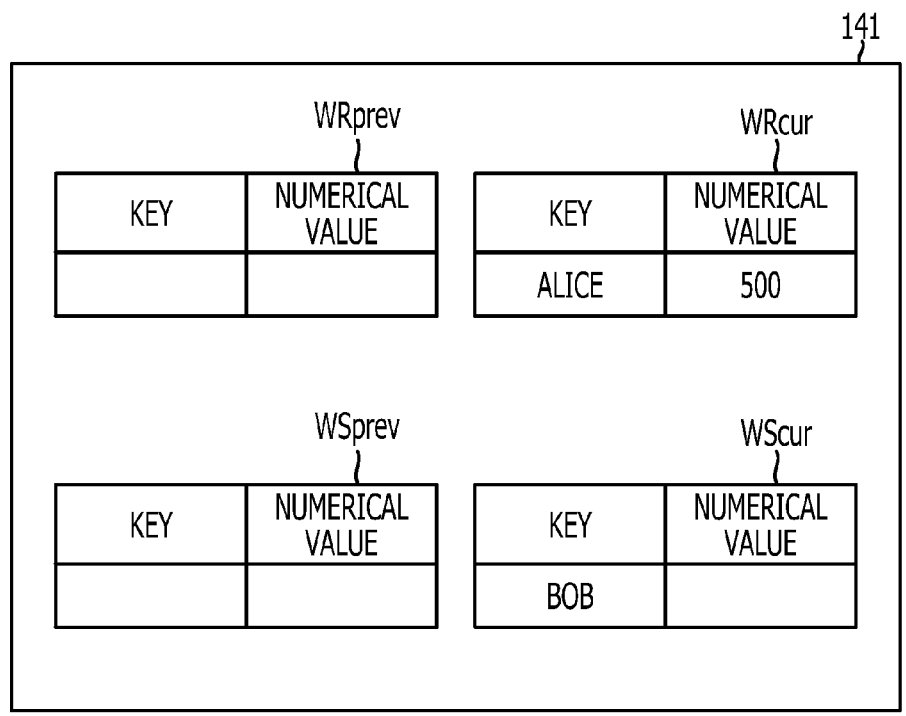
FIG. 12B is a diagram (5) illustrating processing of the combining unit.

FIGS. 12A and 12B will be described. Here the current time is "10:10". As illustrated in FIG. 12A, the combining unit 152 starts receiving the stream data S. The stream data S includes reception data s11. The combining unit 152 registers the key "Bob" and the numerical value "600" of the reception data s11 in WScur of the reception data table 141. As illustrated in FIG. 12B, the key "Bob" and the numerical value "600" are registered in WScur of the reception data table 141. As illustrated in FIG. 12B, because WRcur and WRprev, which are to be compared with the reception data s11, do not have the same key as that of the reception data s11, there are no combined results. Thus, the combining unit 152 does not register any data in the first to fourth storage areas, as in FIG. 11C.

At the current time of "10:10", the timer TR indicates 10 minutes. After the receiving unit 151 sets the timer TS to 0, the timer TS starts.

Figure 13A:
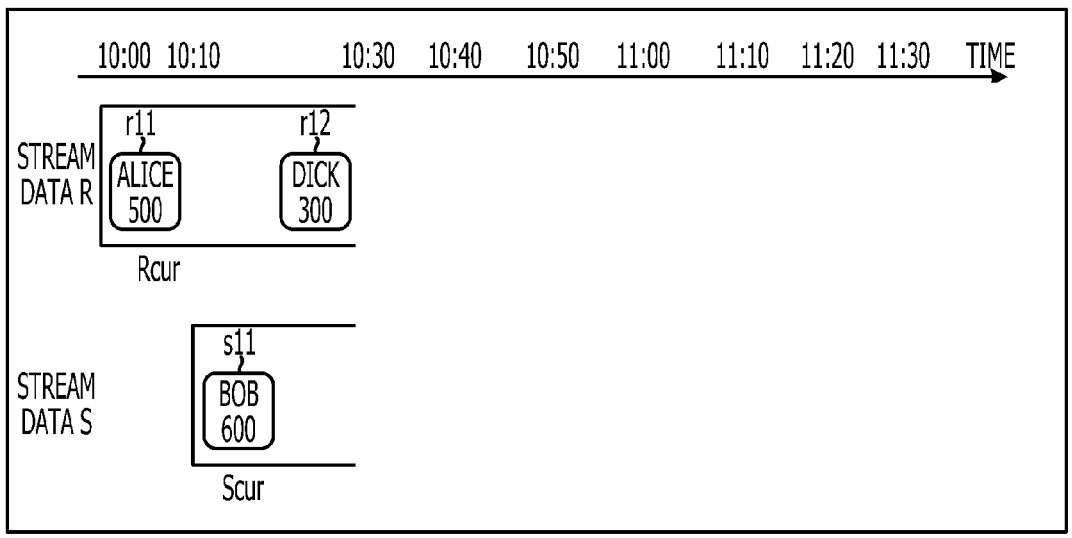
FIG. 13A is a diagram (6) illustrating processing of the combining unit.
Figure 13B:
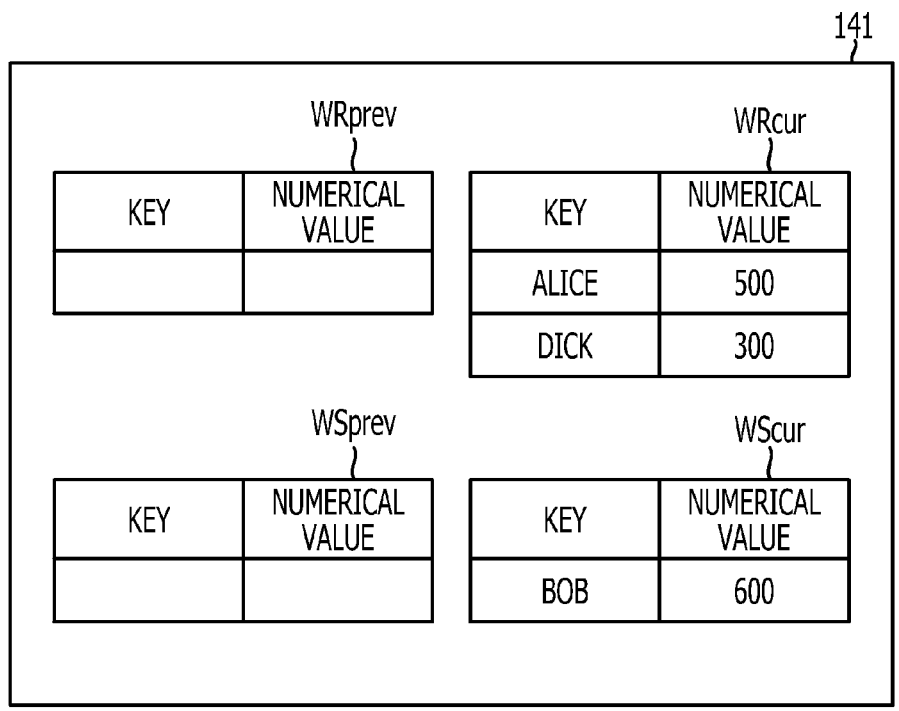
FIG. 13B is a diagram (7) illustrating processing of the combining unit.

FIGS. 13A and 13B will be described. Here the current time is "10:25". As illustrated in FIG. 13A, the combining unit 152 newly receives reception data r12 from the stream data R. The combining unit 152 registers the key "Dick" and the numerical value "300" of the reception data r12 in WRcur of the reception data table 141. As illustrated in FIG. 13B, the key "Dick" and the numerical value "300" are additionally registered in WRcur. As illustrated in FIG. 13B, because WScur and WSprev, which are to be compared with the reception data r12, do not have the same key as that of the reception data r12, there are no combined results. Thus, the combining unit 152 does not register any data in the first to fourth storage areas, as in FIG. 11C.

At the current time of "10:25", the timer TR indicates 25 minutes. The timer TS indicates 15 minutes.

Figure 14A:
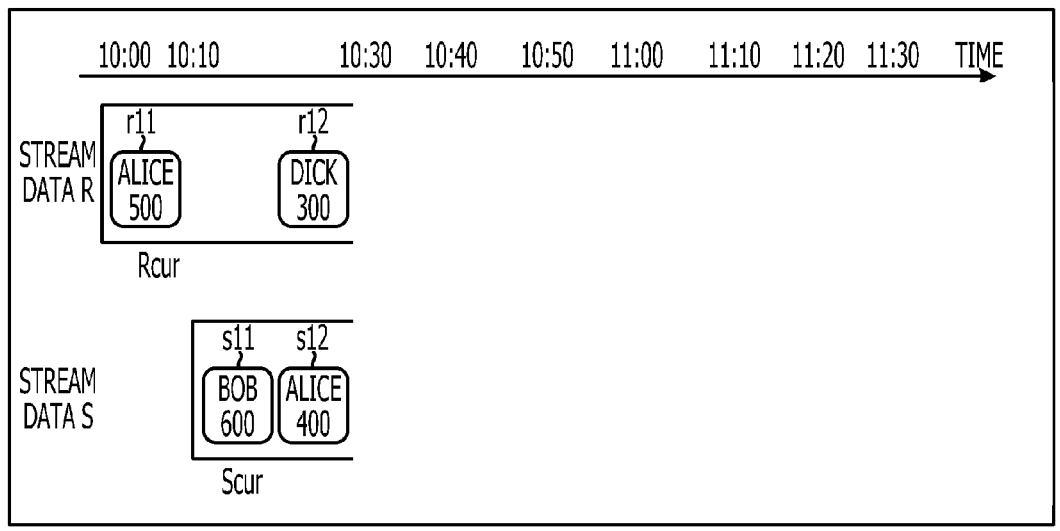
FIG. 14A is a diagram (8) illustrating processing of the combining unit.
Figure 14B:
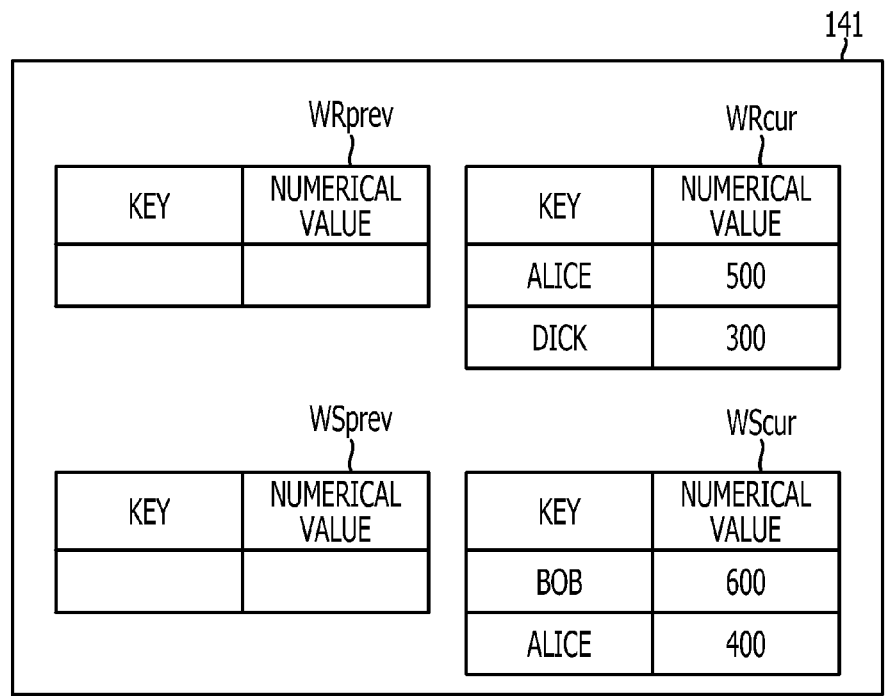
FIG. 14B is a diagram (9) illustrating processing of the combining unit.
Figure 14C:
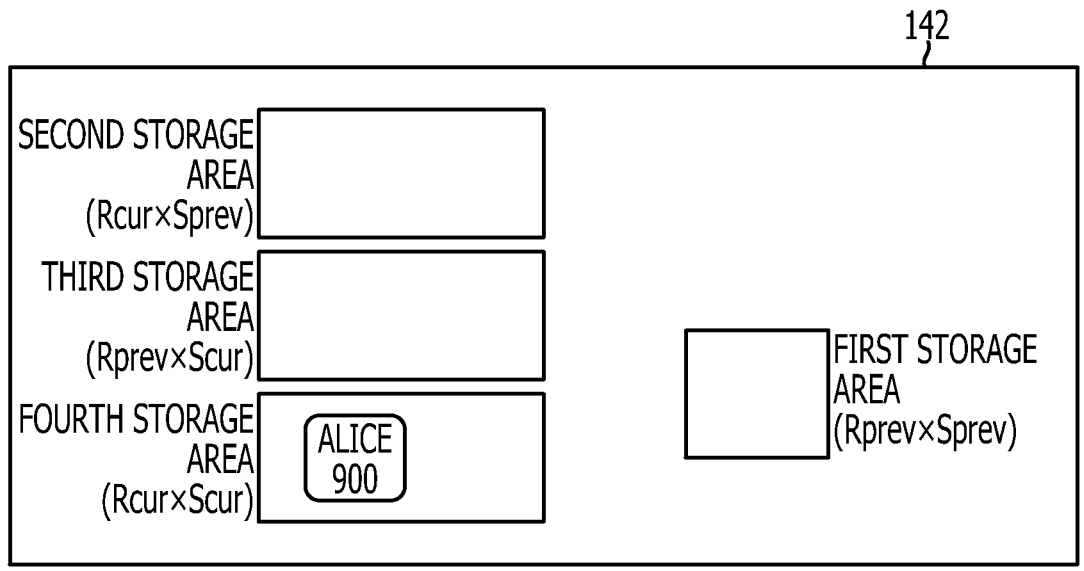
FIG. 14C is a diagram (10) illustrating processing of the combining unit.

FIGS. 14A, 14B, and 14C will be described. Here the current time is "10:27". As illustrated in FIG. 14A, the combining unit 152 newly receives reception data s12 from the stream data S. The combining unit 152 registers the key "Alice" and the numerical value "400" of the reception data s12 in WScur of the reception data table 141. As illustrated in FIG. 14B, the key "Alice" and the numerical value "400" are additionally registered in WScur.

As illustrated in FIG. 14B, the key "Alice" of the reception data s12 matches the key "Alice" in WRcur. Thus, the combining unit 152 combines the reception data s12 with data in WRcur and registers a combined result in the fourth storage area. The total value for Alice is "900". Because WRprev does not have the same key as that of the reception data s12, there is no combined result.

As illustrated in FIG. 14C, the key "Alice" and the total value "900" are registered in the fourth storage area of the result set table 142.

At the current time of "10:27", the timer TR indicates 27 minutes. The timer TS indicates 17 minutes.

Figure 15A:
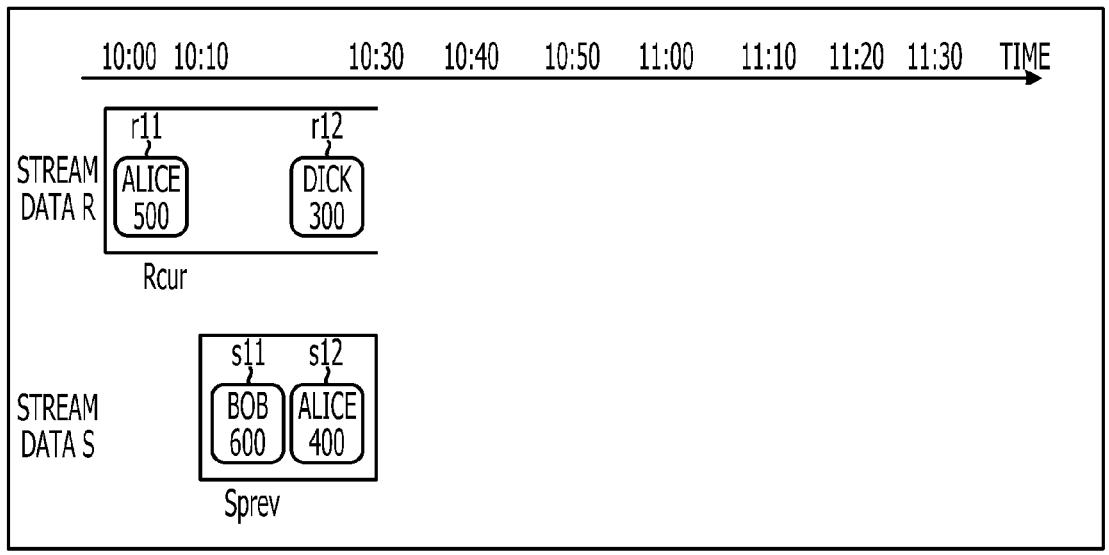
FIG. 15A is a diagram (11) illustrating processing of the combining unit.
Figure 15B:
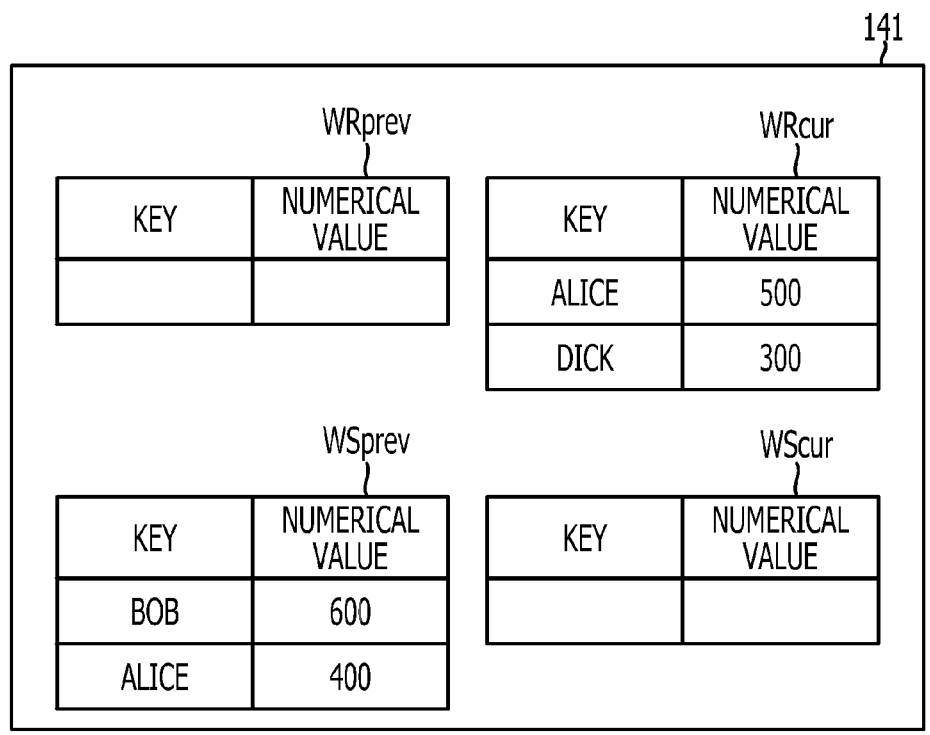
FIG. 15B is a diagram (12) illustrating processing of the combining unit.
Figure 15C:
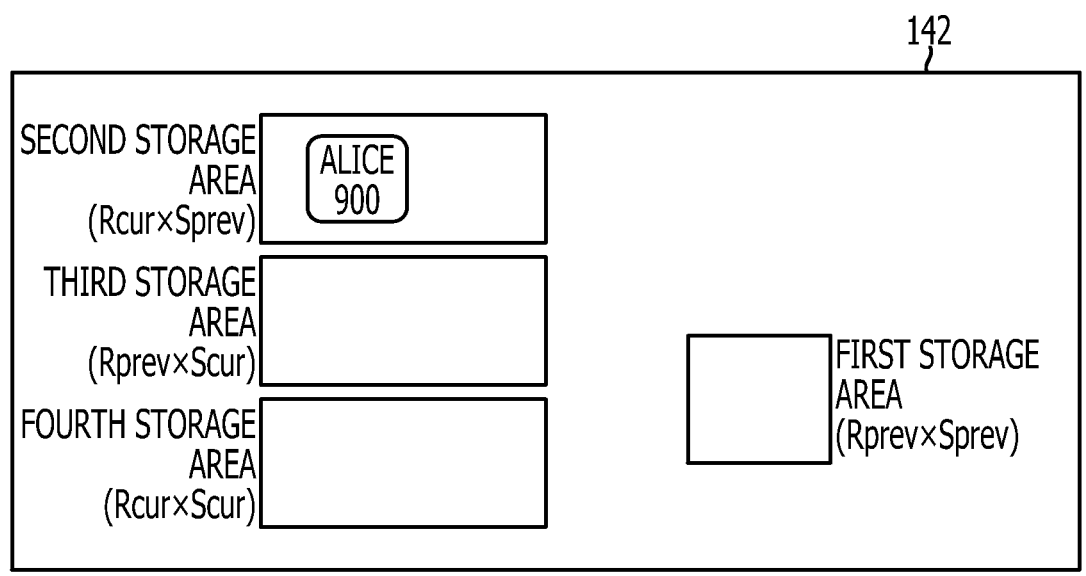
FIG. 15C is a diagram (13) illustrating processing of the combining unit.

FIGS. 15A, 15B, and 15C will be described. Here the current time is "10:30". The combining unit 152 obtains a window closing signal cs. As illustrated in FIG. 15A, the combining unit 152 thereby closes the current window of the stream data S. In the reception data table 141, the combining unit 152 moves data in WScur to WSprev and sets WScur to be an empty list. As illustrated in FIG. 15B, a set with the key "Bob" and the numerical value "600" and a set with the key "Alice" and the numerical value "400" are registered in WSprev. WScur is an empty list.

When the combining unit 152 receives a window closing signal cs, the combining unit 152 registers information in the fourth storage area in the second storage area and sets the fourth storage area to be an empty set. The combining unit 152 registers information in the third storage area in the first storage area and sets the third storage area to be an empty set. As illustrated in FIG. 15C, the combining unit 152 registers information on a set with "Alice" and "900" in the fourth storage area in the second storage area so as to set the fourth storage area to be an empty set.

At the current time of "10:30", the timer TR indicates 30 minutes. The timer TS indicates 20 minutes and corresponds to the window width WS. Hence, the receiving unit 151 outputs a window closing signal cs to the combining unit 152 and resets the timer TS to 0 minutes.

Figure 16A:
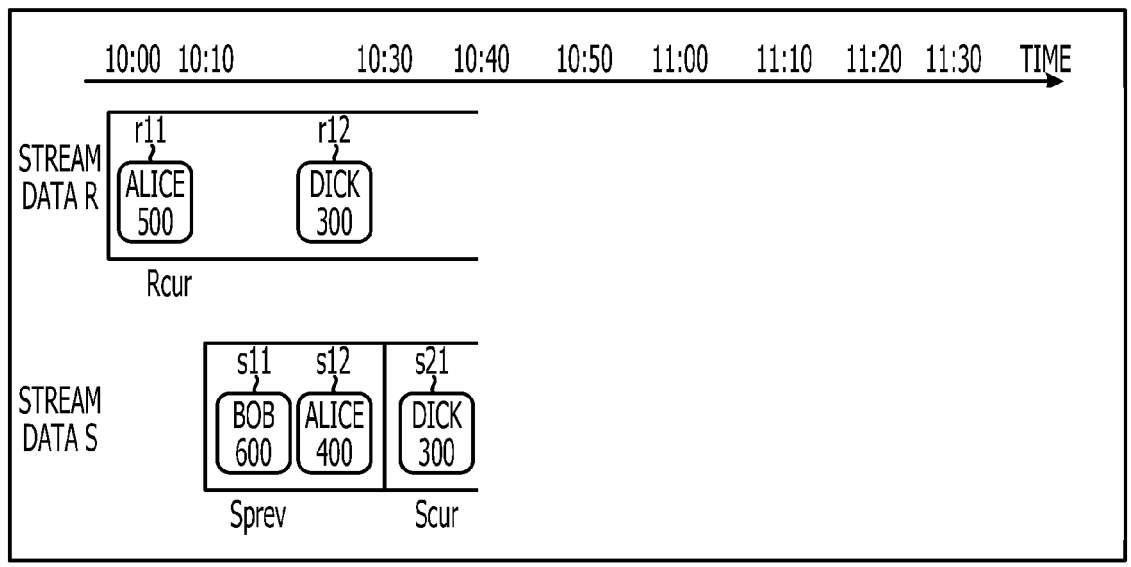
FIG. 16A is a diagram (14) illustrating processing of the combining unit.
Figure 16B:
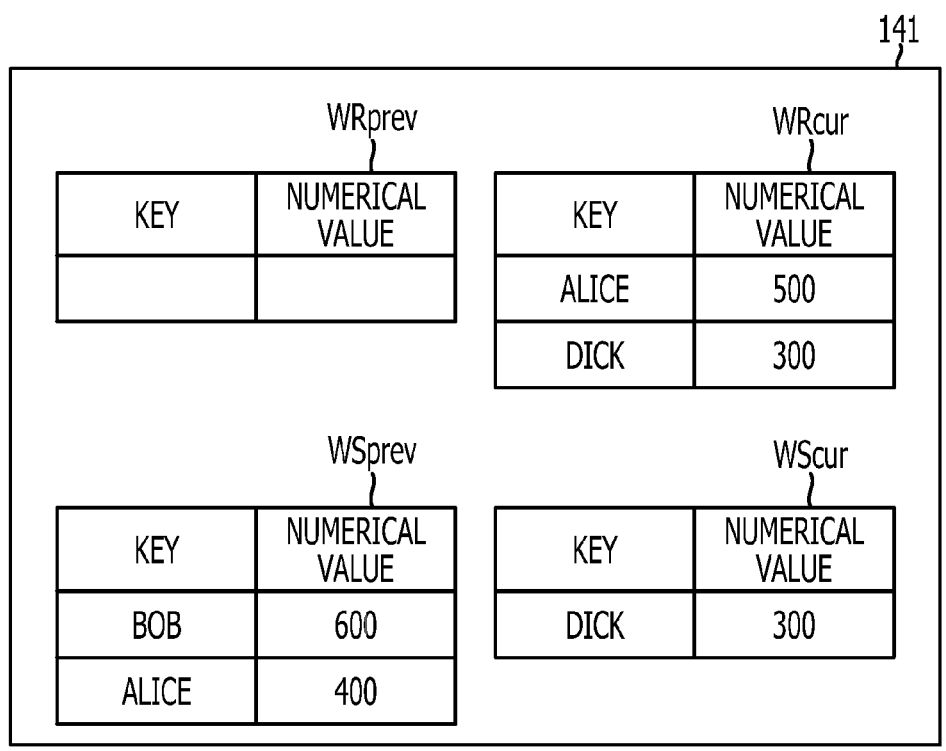
FIG. 16B is a diagram (15) illustrating processing of the combining unit.
Figure 16C:
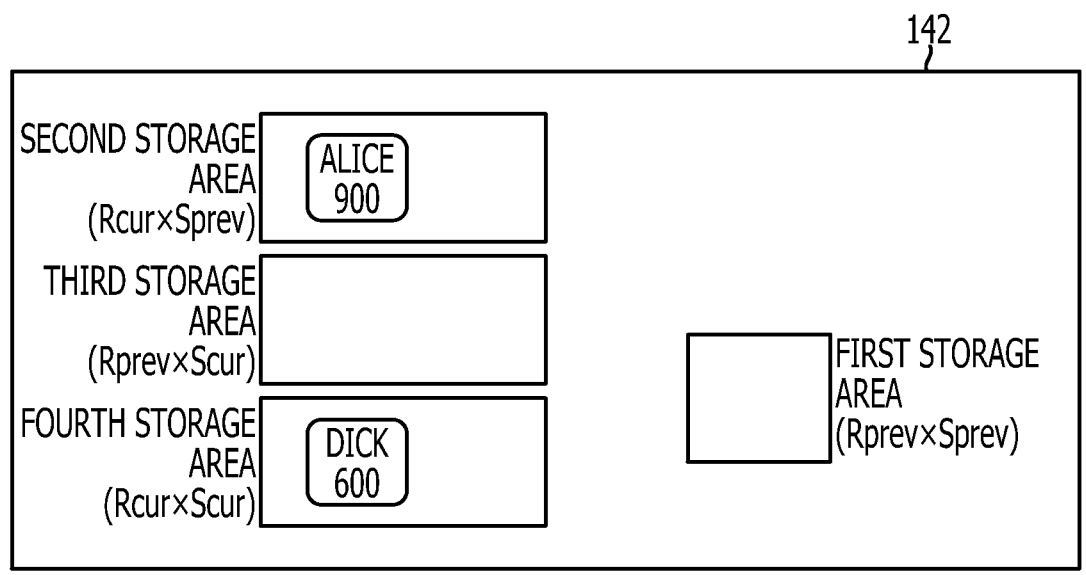
FIG. 16C is a diagram (16) illustrating processing of the combining unit.

FIGS. 16A, 16B, and 16C will be described. Here the current time is "10:35". As illustrated in FIG. 16A, the combining unit 152 newly receives reception data s21 from the stream data S. The combining unit 152 registers the key "Dick" and the numerical value "300" of the reception data s21 in WScur of the reception data table 141. As illustrated in FIG. 16B, the key "Dick" and the numerical value "300" are additionally registered in WScur. As illustrated in FIG. 16B, the key "Dick" of the reception data s21 matches the key "Dick" in WRcur. Thus, the combining unit 152 combines the reception data s21 with data in WRcur and registers a combined result in the fourth storage area. The total value for Dick is "600". Because WRprev does not have the same key as the key for the reception data s21, there is no combined result.

As illustrated in FIG. 16C, the key "Dick" and the total value "600" are registered in the fourth storage area of the result set table 142.

At the current time of "10:35", the timer TR indicates 35 minutes. The timer TS indicates 5 minutes.

Figure 17A:
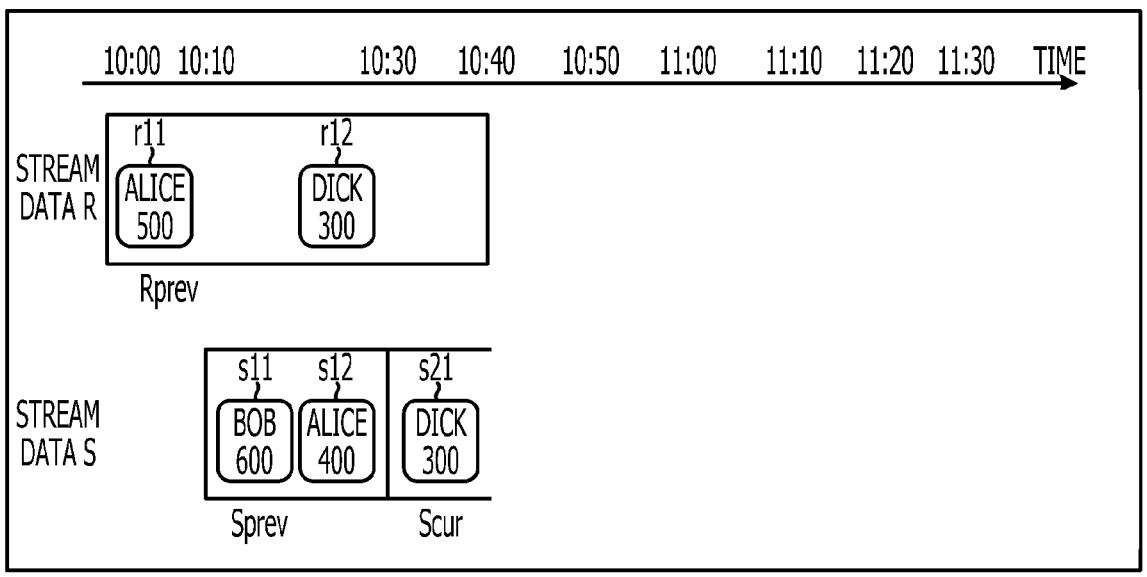
FIG. 17A is a diagram (17) illustrating processing of the combining unit.
Figure 17B:
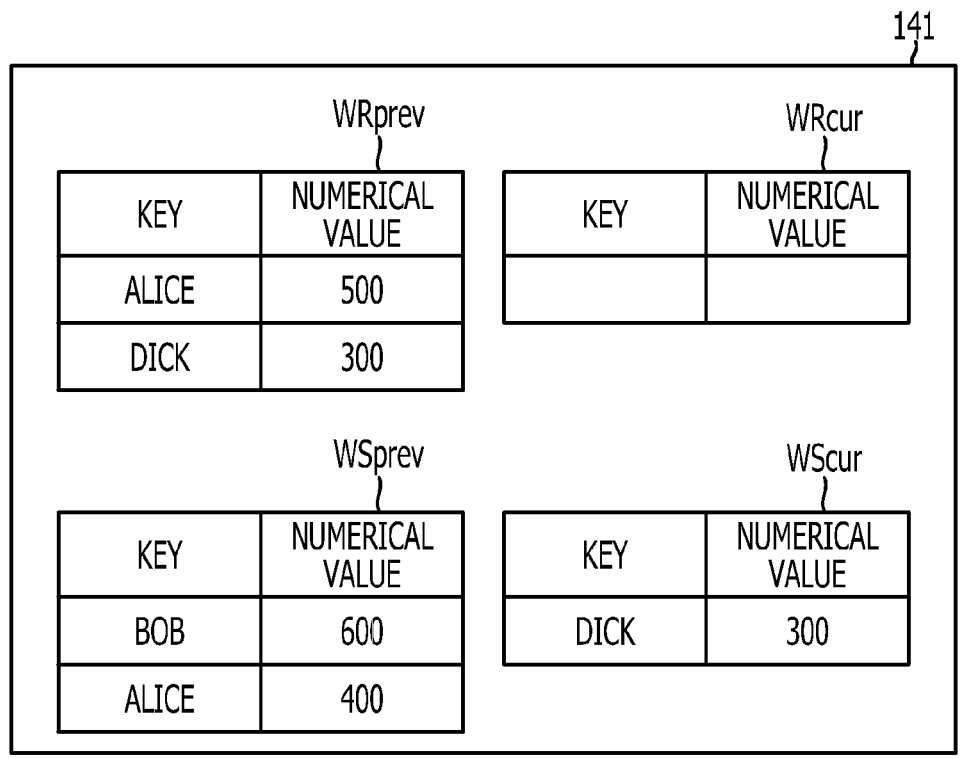
FIG. 17B is a diagram (18) illustrating processing of the combining unit.
Figure 17C:
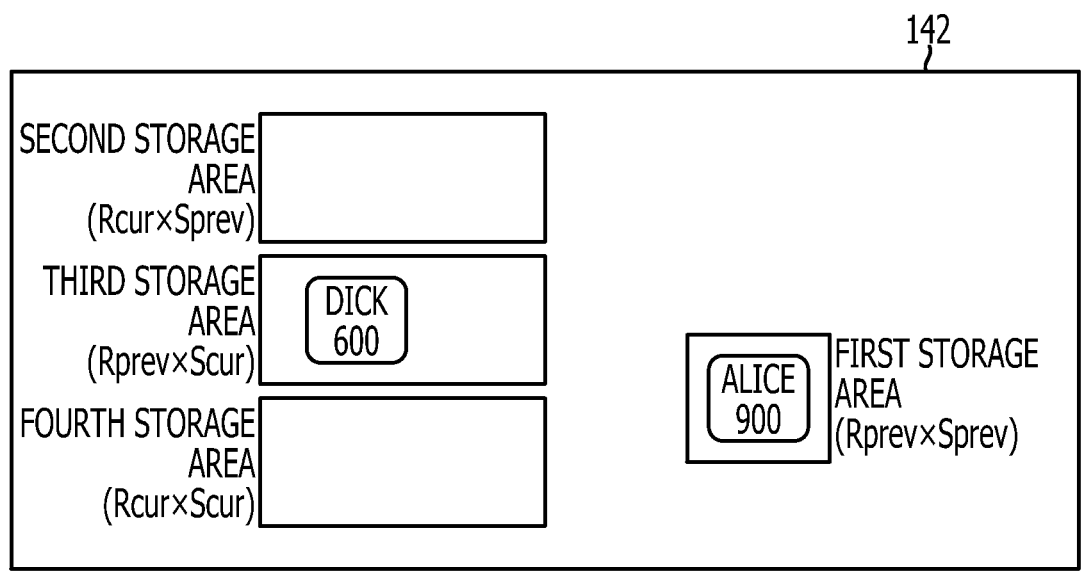
FIG. 17C is a diagram (19) illustrating processing of the combining unit.

FIGS. 17A, 17B, and 17C will be described. Here the current time is "10:40". At this time, the combining unit 152 obtains a window closing signal cr. As illustrated in FIG. 17A, the combining unit 152 thereby closes the current window of the stream data R. In the reception data table 141, the combining unit 152 moves data in WRcur to WRprev and sets WRcur to be an empty list. As illustrated in FIG. 17B, a set with the key "Alice" and the numerical value "500" and a set with the key "Dick" and the numerical value "300" are registered in WRprev. WRcur is an empty list.

When the combining unit 152 receives a window closing signal cr, the combining unit 152 registers information, which is in the fourth storage area, in the third storage area, and sets the fourth storage area to be an empty set. The combining unit 152 registers information, which is in the second storage area, in the first storage area, and sets the second storage area to be an empty set. As illustrated in FIG. 17C, the combining unit 152 registers the set with "Alice" and "900", which is in the second storage area, in the first storage area, and sets the second storage area to be an empty set. The combining unit 152 registers a set for the key "Dick" and the total value "600", which is in the fourth storage area, in the third storage area, and sets the fourth storage area to be an empty set.

At the current time of "10:40", the timer TR indicates 40 minutes and corresponds to the window width WR. Hence, the receiving unit 151 outputs a window closing signal cr to the combining unit 152 and resets the timer TR to 0 minutes. The timer TS indicates 10 minutes.

Figure 18A:
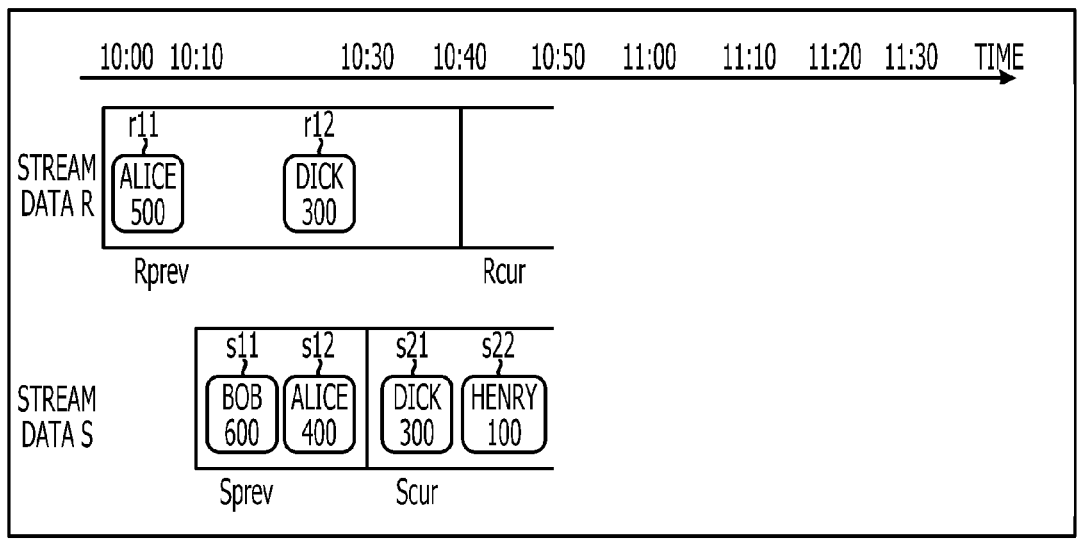
FIG. 18A is a diagram (20) illustrating processing of the combining unit.
Figure 18B:
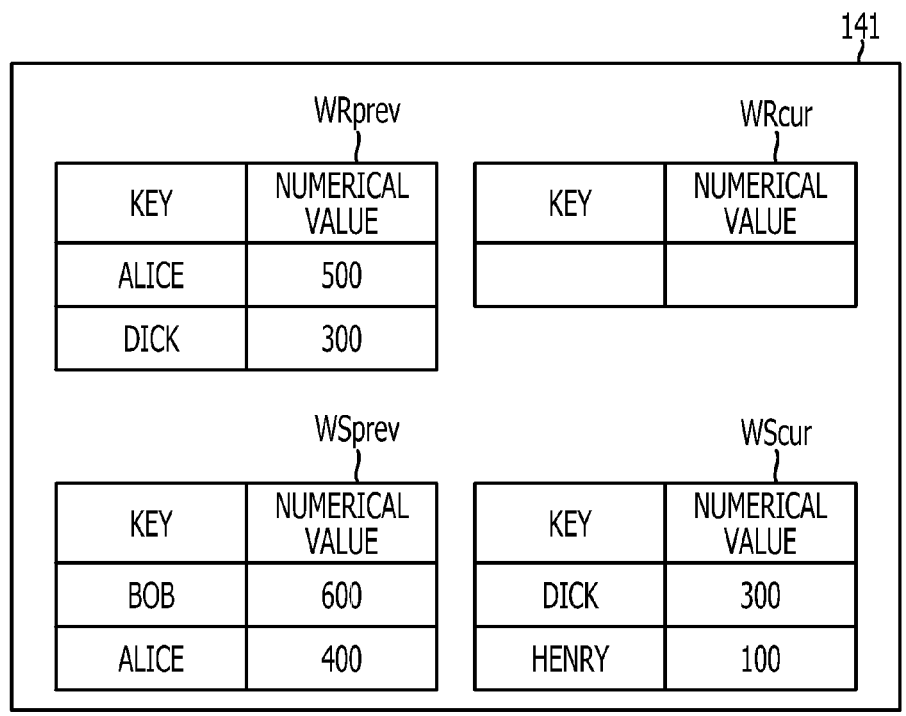
FIG. 18B is a diagram (21) illustrating processing of the combining unit.

FIGS. 18A and 18B will be described. Here the current time is "10:42". As illustrated in FIG. 18A, the combining unit 152 newly receives reception data s22 from the stream data S. The combining unit 152 additionally registers the key "Henry" and the numerical value "100" in WScur of the reception data table 141. As illustrated in FIG. 18B, the key "Henry" and the numerical value "100" are additionally registered in WScur. As illustrated in FIG. 18B, WRcur and WRprev do not have the same key as that of the reception data s22 and there are no combined results. Data registered in the result set table 142 is the same as in FIG. 17C.

At the current time of "10:42", the timer TR indicates 2 minutes. The timer TS indicates 12 minutes.

Figure 19A:
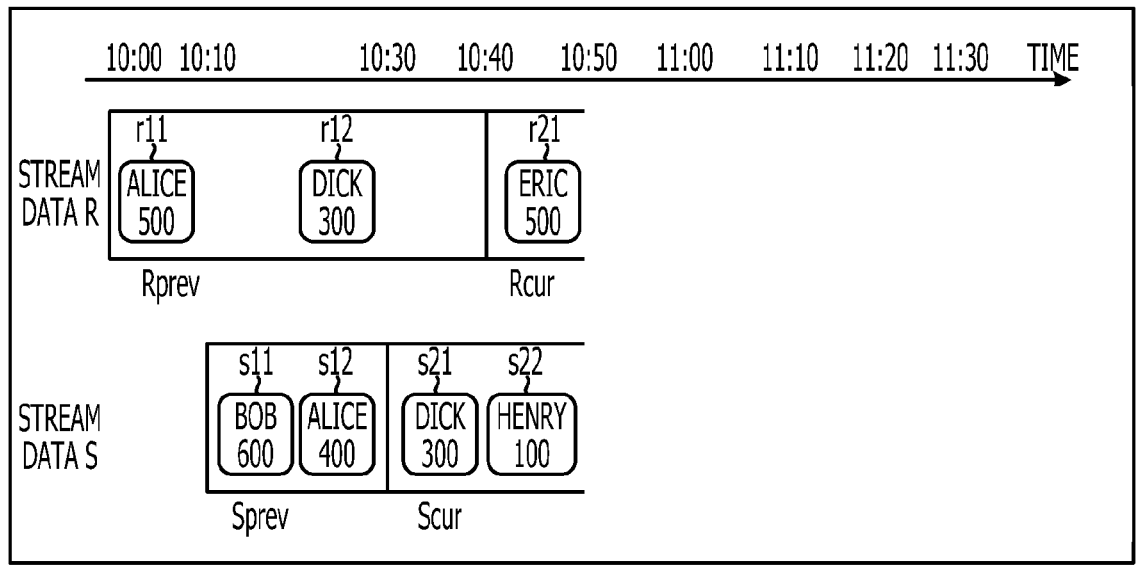
FIG. 19A is a diagram (22) illustrating processing of the combining unit.
Figure 19B:
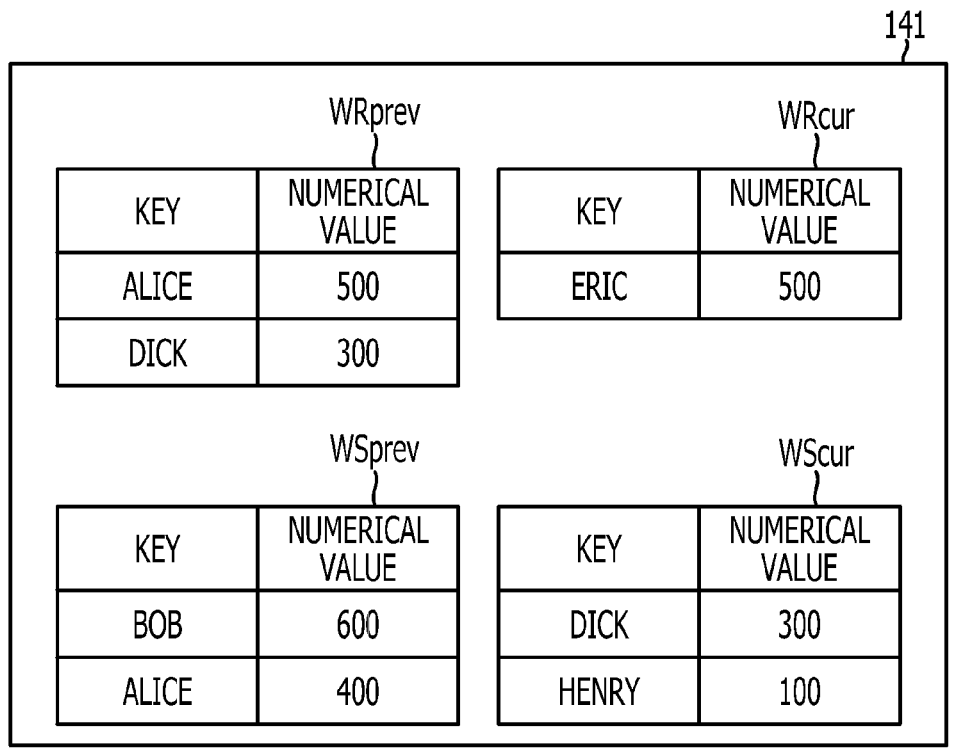
FIG. 19B is a diagram (23) illustrating processing of the combining unit.

FIGS. 19A and 19B will be described. Here the current time is "10:45". As illustrated in FIG. 19A, the combining unit 152 newly receives reception data r21 from the stream data R. The combining unit 152 additionally registers the key "Eric" and the numerical value "500" in WRcur of the reception data table 141. As illustrated in FIG. 19B, the key "Eric" and the numerical value "500" are additionally registered in WRcur. As illustrated in FIG. 19B, WScur and WSprev do not have the same key as that of the reception data r21 and there are no combined results. Data registered in the result set table 142 is the same as in FIG. 17C.

At the current time of "10:45", the timer TR indicates 5 minutes. The timer TS indicates 15 minutes.

Figure 20A:
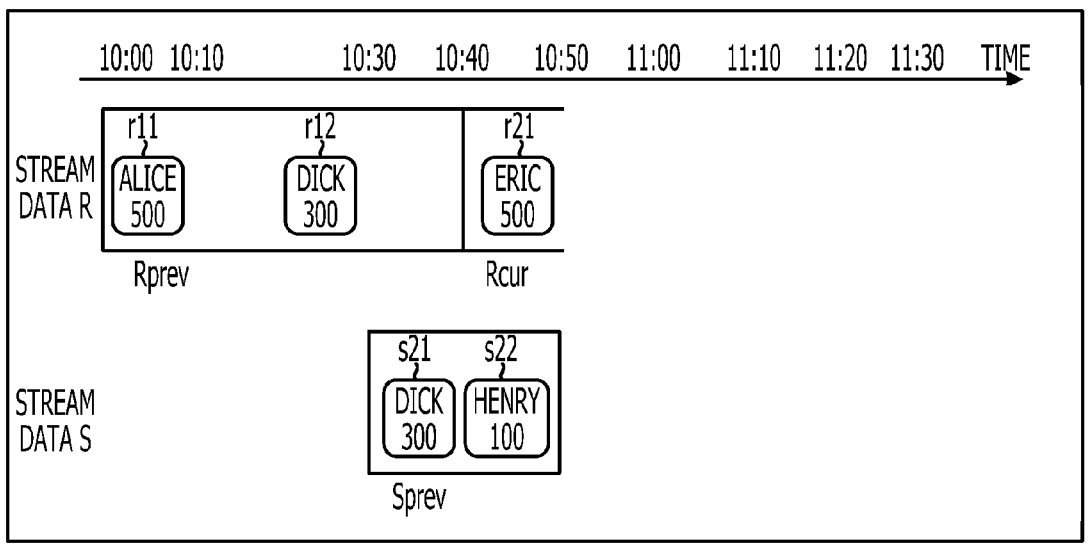
FIG. 20A is a diagram (24) illustrating processing of the combining unit.
Figure 20B:
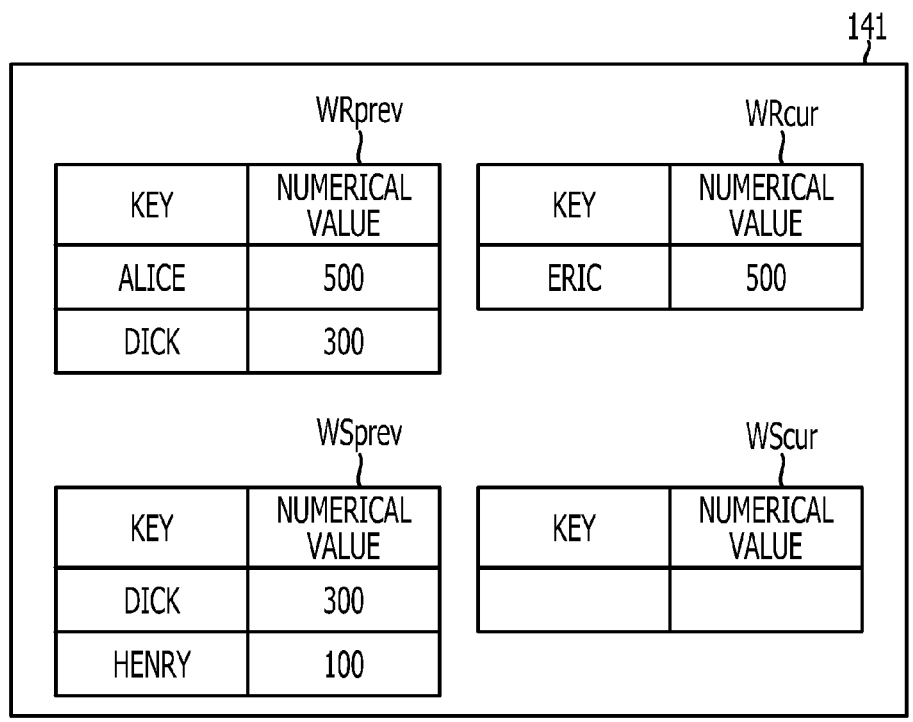
FIG. 20B is a diagram (25) illustrating processing of the combining unit.
Figure 20C:
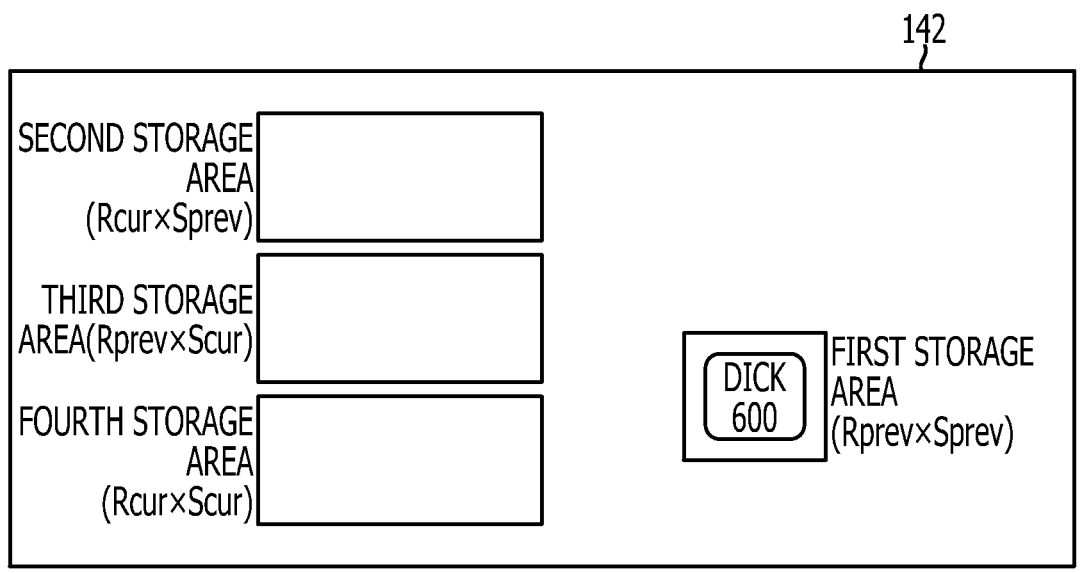
FIG. 20C is a diagram (26) illustrating processing of the combining unit.

FIGS. 20A, 20B, and 20C will be described. Here the current time is "10:50". At this time, the combining unit 152 obtains a window closing signal cs. As illustrated in FIG. 20A, the combining unit 152 thereby closes the current window of the stream data S. In the reception data table 141, the combining unit 152 moves data in WScur to WSprev and sets WScur to be an empty list. As illustrated in FIG. 20B, a set with the key "Dick" and the numerical value "300" as well as a set with the key "Henry" and the numerical value "100" are registered in WSprev. WScur is an empty list.

When the combining unit 152 receives a window closing signal cs, the combining unit 152 registers information, which is in the fourth storage area, in the second storage area, and sets the fourth storage area to be an empty set. The combining unit 152 registers information, which is in the third storage area, in the first storage area, and sets the third storage area to be an empty set. As illustrated in FIG. 20C, the combining unit 152 registers the set for "Dick" and "600", which is in the third storage area, in the first storage area, and sets the third storage area to be an empty set.

Figure 21A:
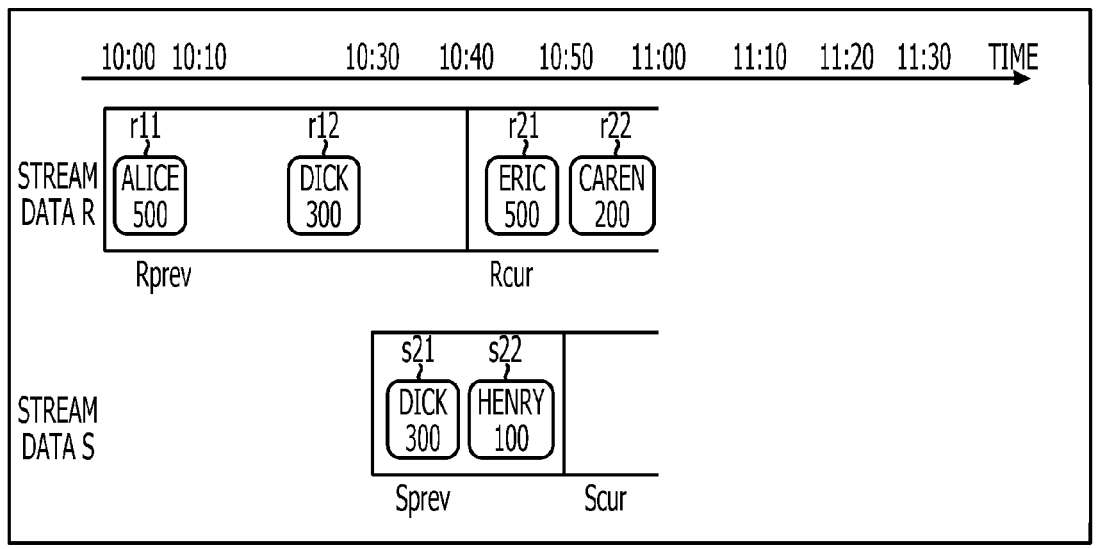
FIG. 21A is a diagram (27) illustrating processing of the combining unit.
Figure 21B:
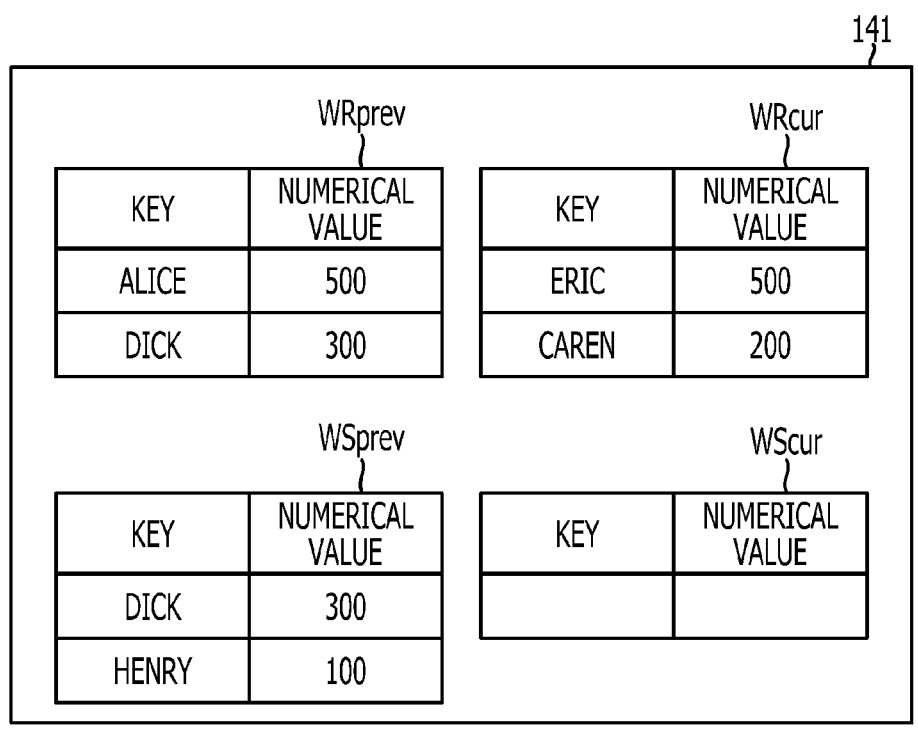
FIG. 21B is a diagram (28) illustrating processing of the combining unit.

FIGS. 21A and 21B will be described. As in FIGS. 20A to 20C, the current time is "10:50". As illustrated in FIG. 21A, the combining unit 152 newly receives reception data r22 from the stream data R. The combining unit 152 registers the key "Caren" and the numerical value "200" of the reception data r22 in WRcur of the reception data table 141. As illustrated in FIG. 21B, the key "Caren" and the numerical value "200" are additionally registered in WRcur. As illustrated in FIG. 20B, because WSprev and WScur do not have the same key as the key "Caren" of the reception data r22, there are no combined results. Data registered in the result set table 142 is the same as in FIG. 20C.

Figure 22A:
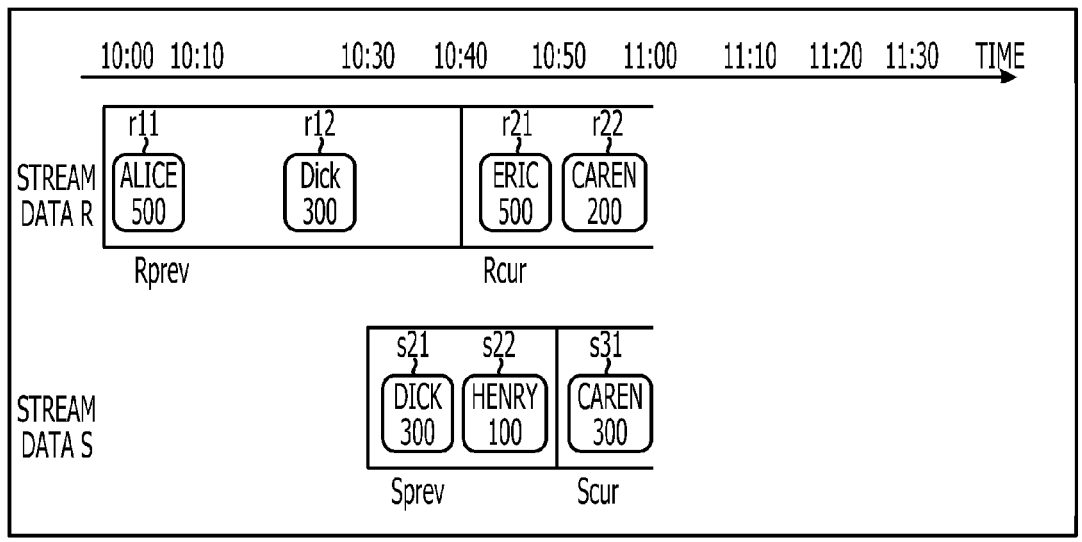
FIG. 22A is a diagram (29) illustrating processing of the combining unit.
Figure 22B:
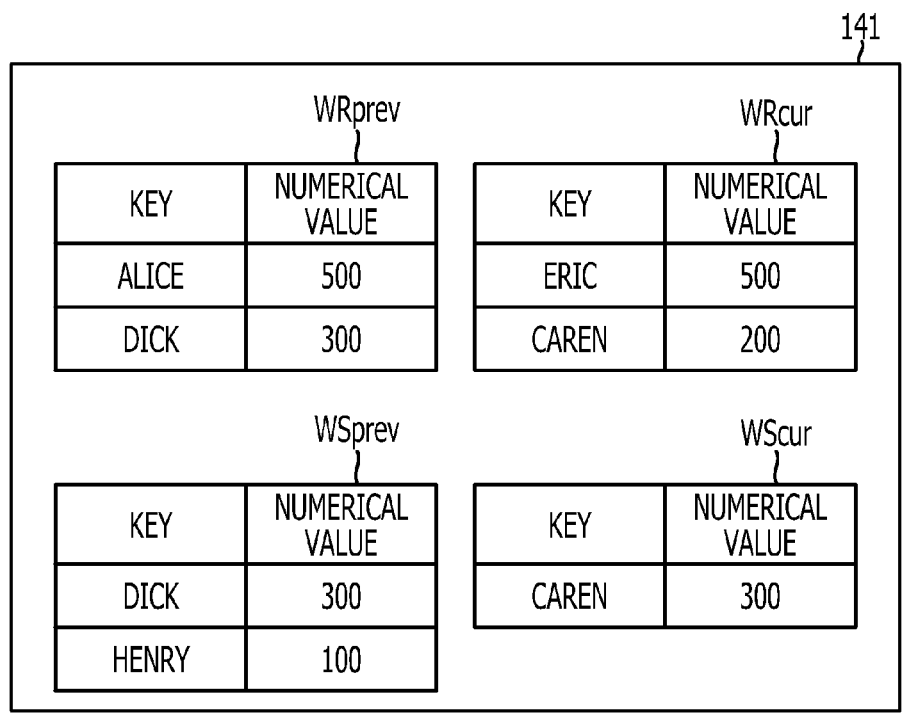
FIG. 22B is a diagram (30) illustrating processing of the combining unit.
Figure 22C:
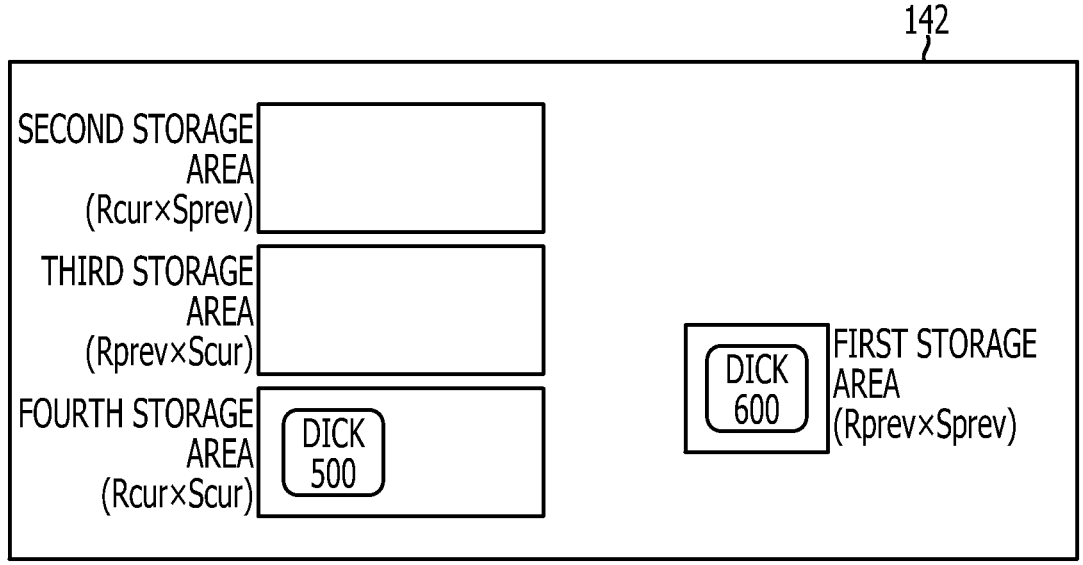
FIG. 22C is a diagram (31) illustrating processing of the combining unit.

FIGS. 22A, 22B, and 22C will be described. As in FIGS. 20A to 20C, 21A, and 21B, the current time is "10:50". As illustrated in FIG. 22A, the combining unit 152 newly receives reception data s31 from the stream data S. The combining unit 152 additionally registers the key "Caren" and the numerical value "300" in WScur of the reception data table 141. As illustrated in FIG. 22B, the key "Caren" and the numerical value "300" are additionally registered in WScur. As illustrated in FIG. 22B, the key of the reception data s31 matches a key in WRcur. Thus, the combining unit 152 combines the reception data s31 with data in WRcur and registers the combined result in the fourth storage area. The total value for Caren is "500". Because WRprev does not have the same key as that of the reception data s31, there is no combined result.

As illustrated in FIG. 22C, the key "Caren" and the total value "500" are registered in the fourth storage area of the result set table 142.

At the current time of "10:50", the timer TR indicates 10 minutes. The timer TS indicates 20 minutes and corresponds to the window width WS. Hence, the receiving unit 151 outputs a window closing signal cs to the combining unit 152 and resets the timer TS to 0 minutes.

Figure 23A:
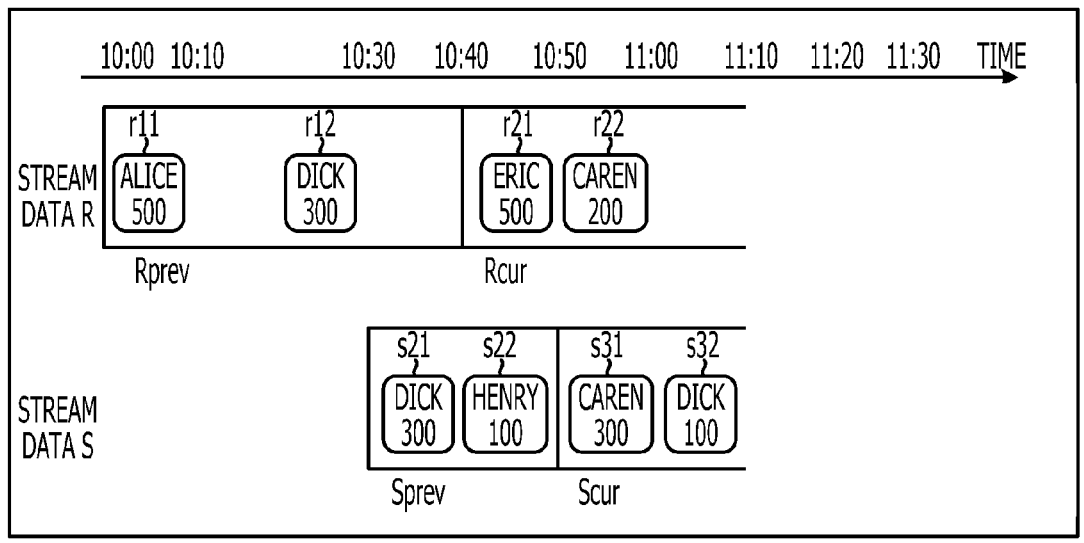
FIG. 23A is a diagram (32) illustrating processing of the combining unit.
Figure 23B:
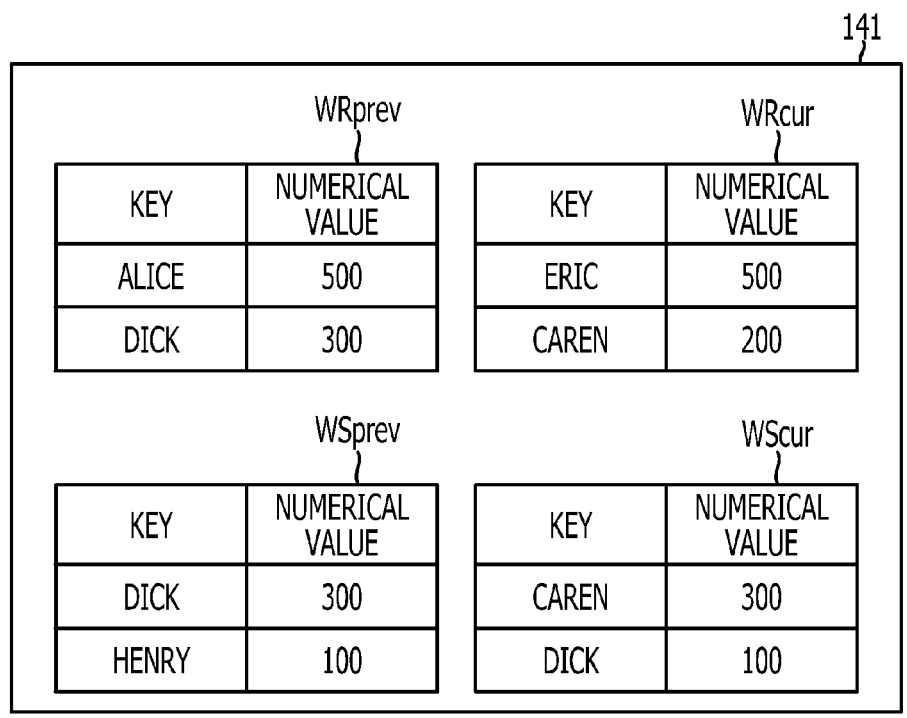
FIG. 23B is a diagram (33) illustrating processing of the combining unit.
Figure 23C:
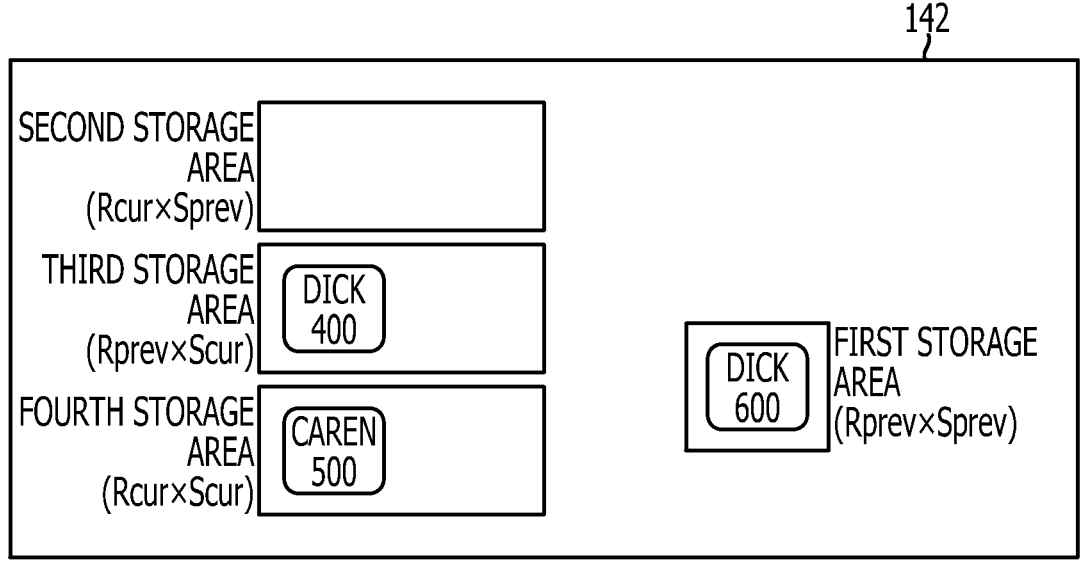
FIG. 23C is a diagram (34) illustrating processing of the combining unit.

FIGS. 23A, 23B, and 23C will be described. Here the current time is "11:00". As illustrated in FIG. 23A, the combining unit 152 newly receives reception data s32 from the stream data S. The combining unit 152 additionally registers the key "Dick" and the numerical value "100" in WScur of the reception data table 141. As illustrated in FIG. 23B, the key "Dick" and the numerical value "100" are additionally registered in WScur. As illustrated in FIG. 23B, the key "Dick" of the reception data s32 matches the key "Dick" in WRprev. Thus, the combining unit 152 combines the reception data s32 with data in WRprev and registers a combined result in the third storage area. The total value for Dick is "400". Because WRcur does not have the same key as the key of the reception data s32, there is no combined result.

As illustrated in FIG. 23C, the key "Dick" and the total value "400" are registered in the third storage area of the result set table 142.

At the current time of "11:00", the timer TR indicates 20 minutes. The timer TS indicates 10 minutes.

Figure 24A:
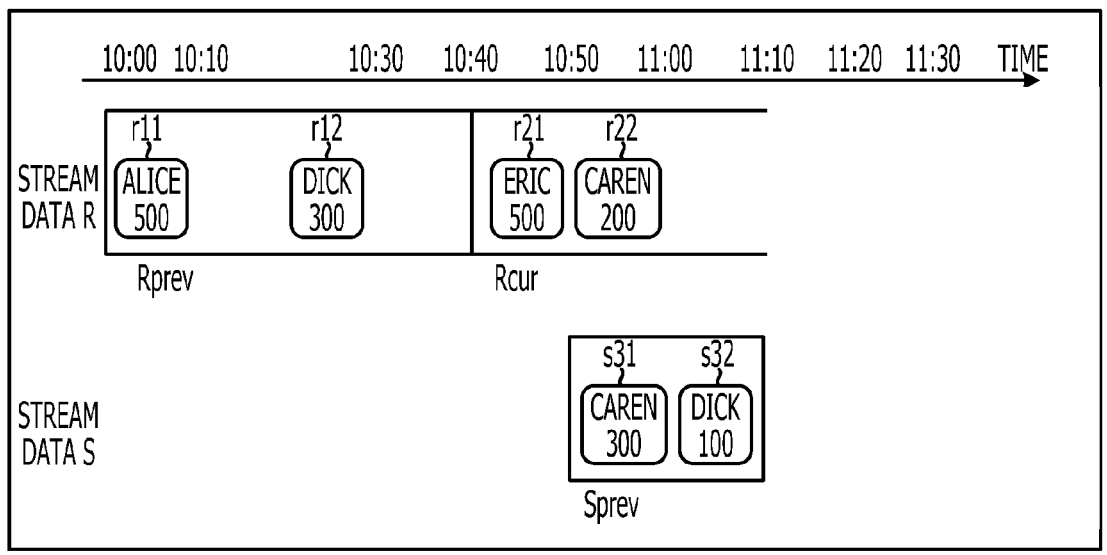
FIG. 24A is a diagram (35) illustrating processing of the combining unit.
Figure 24B:
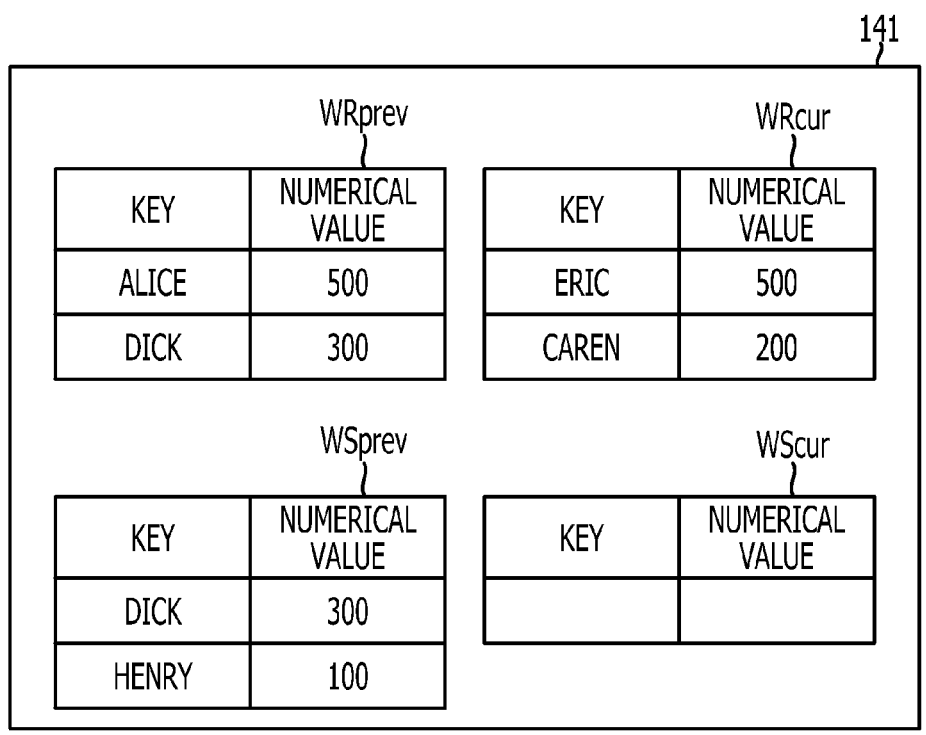
FIG. 24B is a diagram (36) illustrating processing of the combining unit.
Figure 24C:
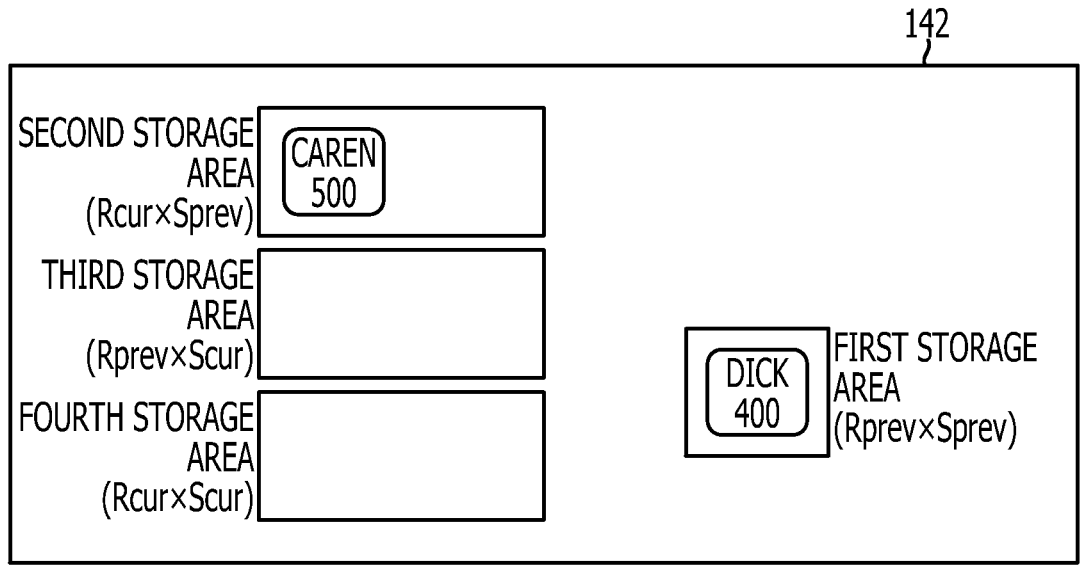
FIG. 24C is a diagram (37) illustrating processing of the combining unit.

FIGS. 24A, 24B, and 24C will be described. Here the current time is "11:10". The combining unit 152 obtains a window closing signal cs. As illustrated in FIG. 24A, the combining unit 152 thereby closes a current window of the stream data S. In the reception data table 141, the combining unit 152 moves data in WScur to WSprev and sets WScur to be an empty list. As illustrated in FIG. 24B, a set with the key "Caren" and the numerical value "300" and a set with the key "Dick" and the numerical value "100" are registered in WSprev. WScur is an empty list.

When the combining unit 152 receives a window closing signal cs, the combining unit 152 registers information, which is in the fourth storage area, in the second storage area, and sets the fourth storage area to be an empty set. The combining unit 152 registers information, which is in the third storage, area in the first storage area, and sets the third storage area to be an empty set. As illustrated in FIG. 24C, the combining unit 152 registers information on a set for "Caren" and "500", which is in the fourth storage area, in the second storage area, and sets the fourth storage area to be an empty set. The combining unit 152 registers information on a set for "Dick" and "400", which is in the third storage area, in the first storage area, and sets the third storage area to be an empty set.

At the current time of "11:10", the timer TR indicates 30 minutes. The timer TS indicates 20 minutes and corresponds to the window width WS. Hence, the receiving unit 151 outputs a window closing signal cs to the combining unit 152 and resets the timer TS to 0 minutes.

Figure 25A:
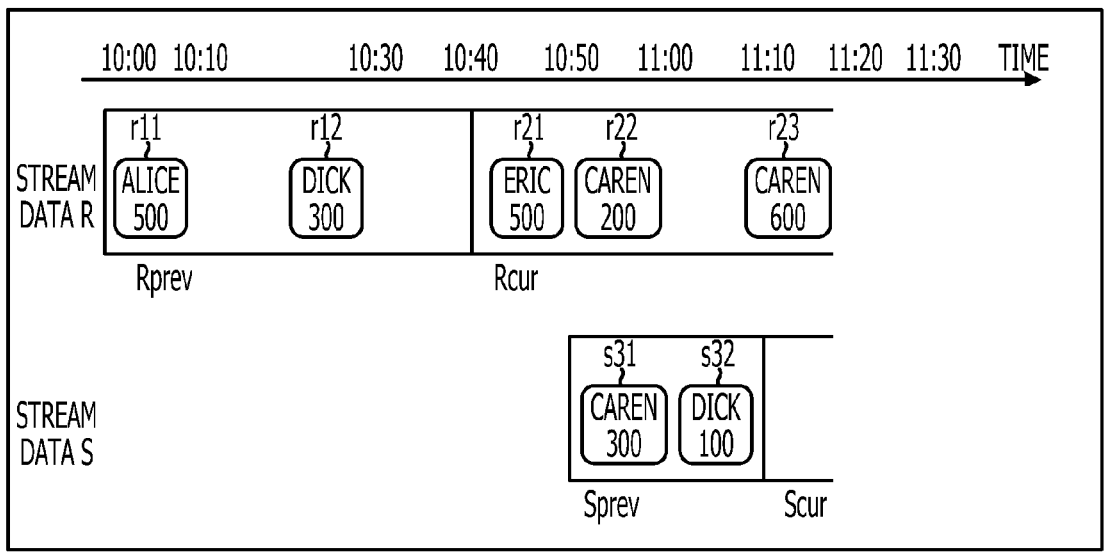
FIG. 25A is a diagram (38) illustrating processing of the combining unit.
Figure 25B:
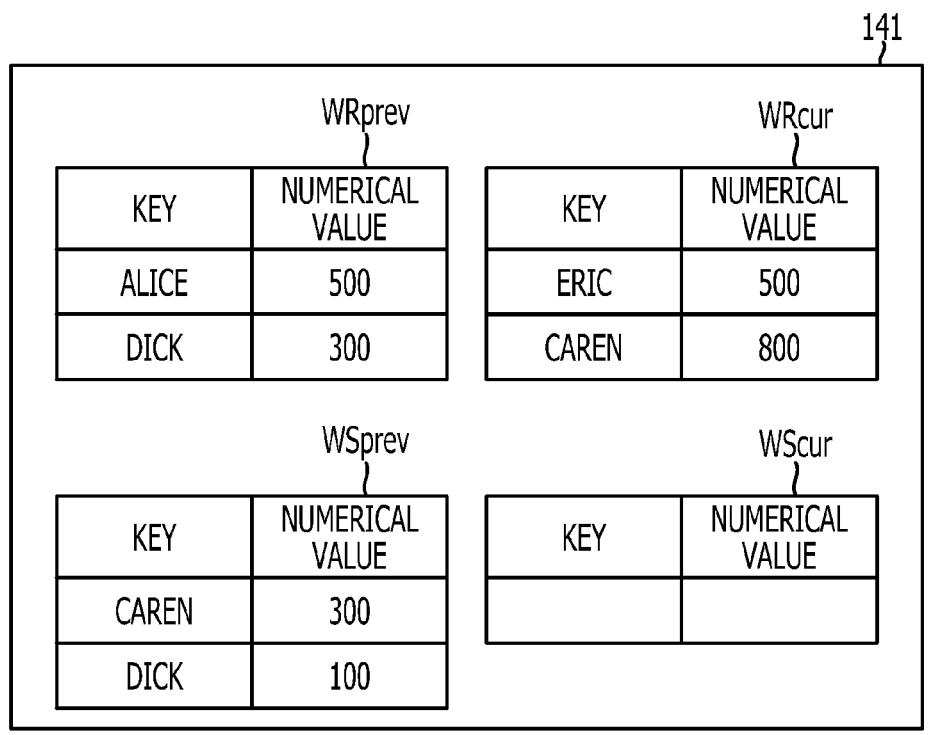
FIG. 25B is a diagram (39) illustrating processing of the combining unit.
Figure 25C:
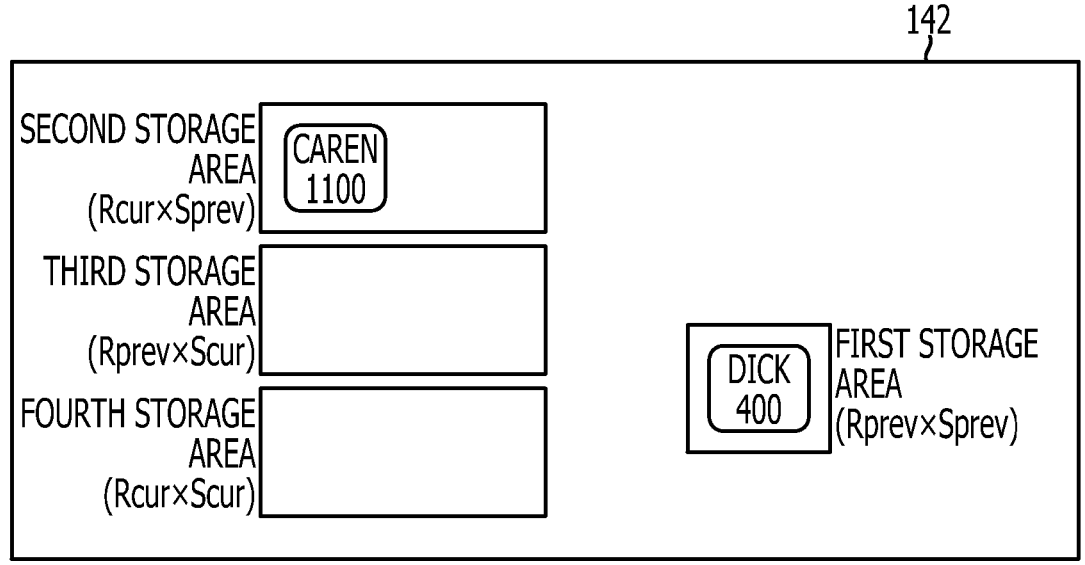
FIG. 25C is a diagram (40) illustrating processing of the combining unit.

FIGS. 25A, 25B, and 25C will be described. Here the current time is "11:15". The combining unit 152 newly receives reception data r23 from the stream data R. The combining unit 152 has already registered "Caren" in WRcur of the reception data table 141. In this case, as illustrated in FIG. 25B, the combining unit 152 updates the numerical value of the key "Caren" in WRcur to "800". As illustrated in FIG. 25C, the combining unit 152 updates the total value in the second storage area by adding "600" to the total value in the second storage area. In the case illustrated in FIGS. 25A to 25C, the combining unit 152 does not compare the reception data r23 with data in WScur and WSprev.

At the current time of "11:15", the timer TR indicates 35 minutes. The timer TS indicates 5 minutes.

Figure 26A:
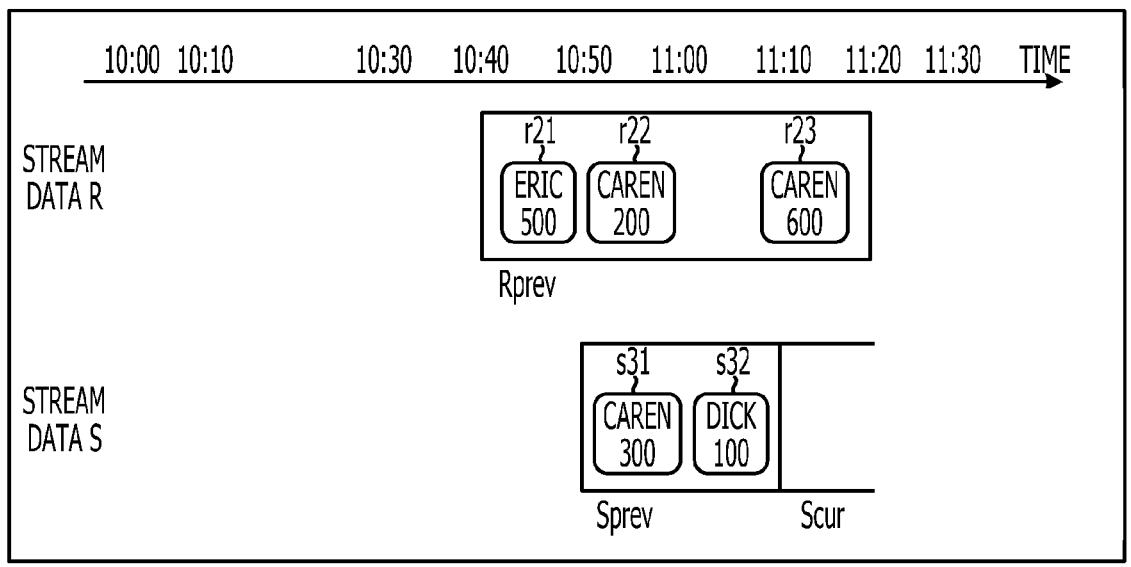
FIG. 26A is a diagram (41) illustrating processing of the combining unit.
Figure 26B:
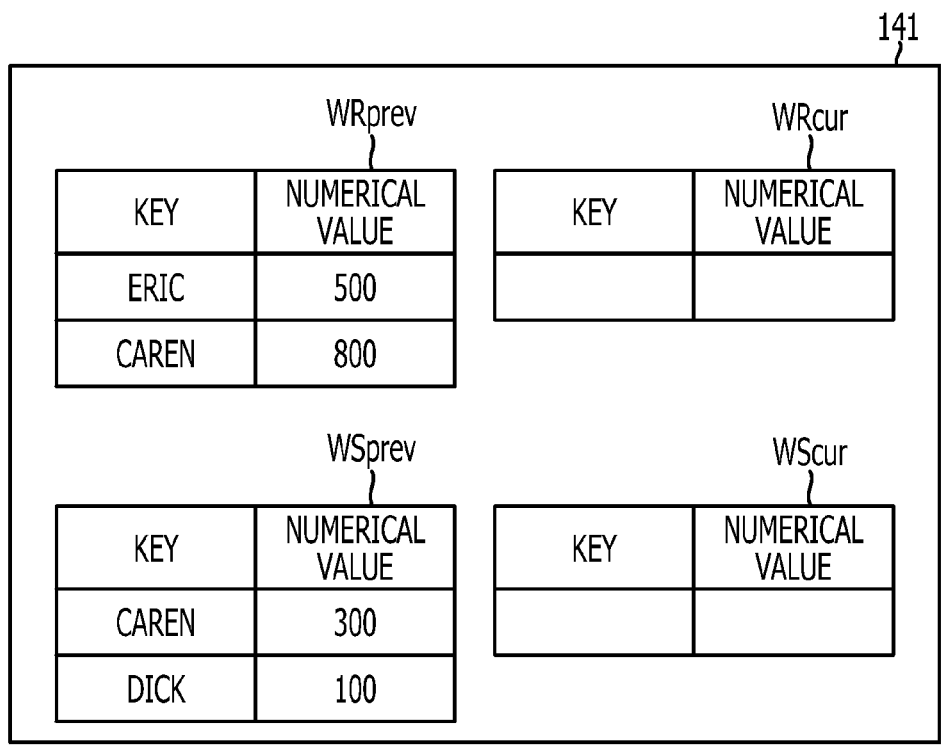
FIG. 26B is a diagram (42) illustrating processing of the combining unit.
Figure 26C:
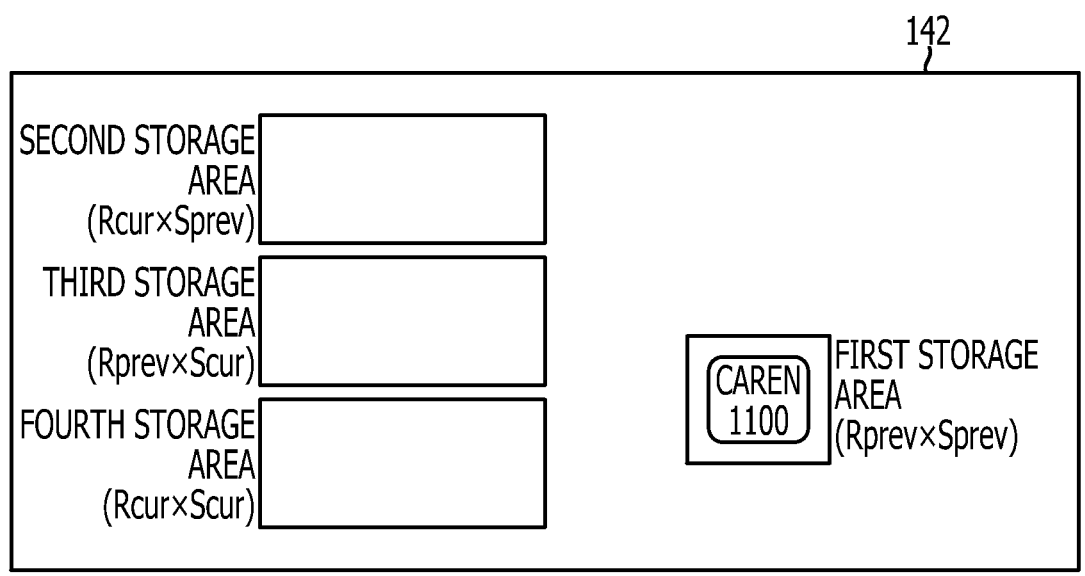
FIG. 26C is a diagram (43) illustrating processing of the combining unit.

FIGS. 26A, 26B, and 26C will be described. Here the current time is "11:20". At this time, the combining unit 152 obtains a window closing signal cr. As illustrated in FIG. 26A, the combining unit 152 thereby closes a current window of the stream data R. In the reception data table 141, the combining unit 152 moves data in WRcur to WRprev and sets WRcur to be an empty list. As illustrated in FIG. 26B, a set with the key "Eric" and the numerical value "500" and a set with the key "Caren" and the numerical value "800" are registered in WRprev. WRcur is an empty list.

When the combining unit 152 receives a window closing signal cr, the combining unit 152 registers information, which is in the fourth storage area, in the third storage area, and sets the fourth storage area to be an empty set. The combining unit 152 registers information, which is in the second storage area, in the first storage area, and sets the second storage area to be an empty set. As illustrated in FIG. 26C, the combining unit 152 registers a set for "Caren" and "1100", which is in the second storage area, in the first storage area, and sets the second storage area to be an empty set.

Figure 27A:
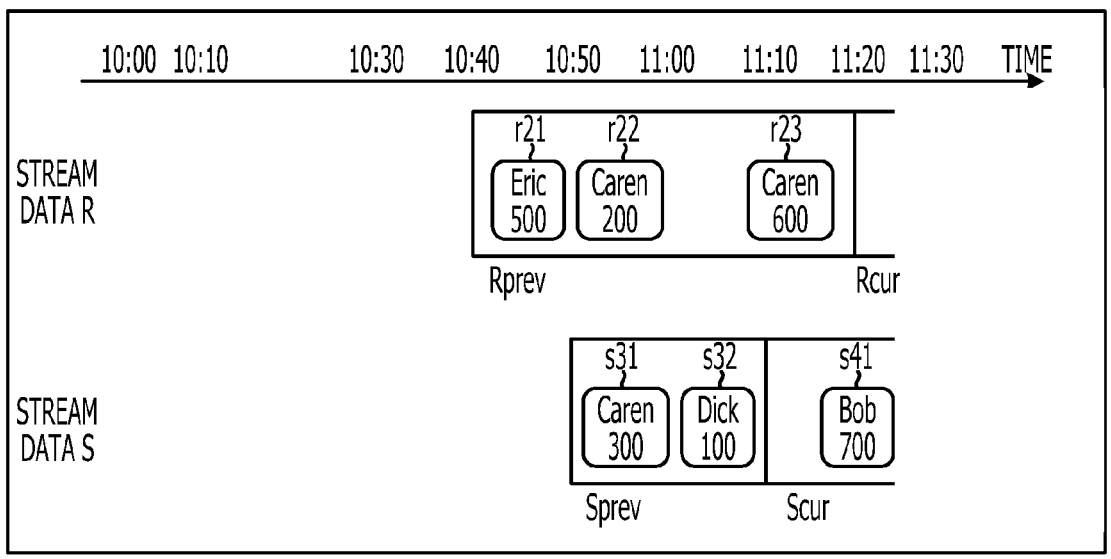
FIG. 27A is a diagram (44) illustrating processing of the combining unit.
Figure 27B:
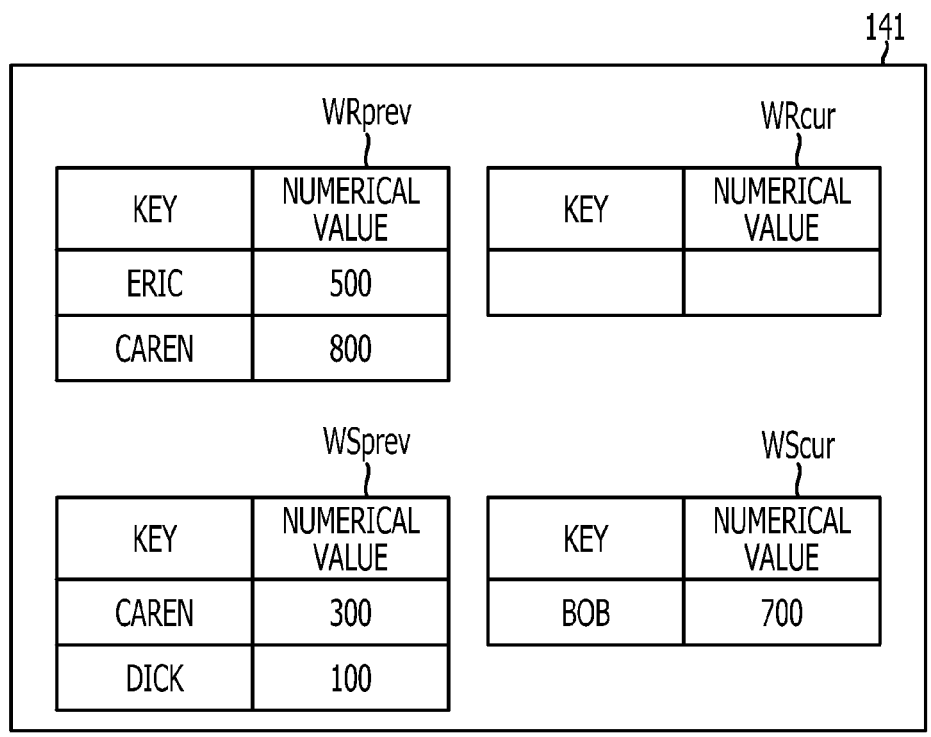
FIG. 27B is a diagram (45) illustrating processing of the combining unit.

FIGS. 27A and 27B will be described. As in FIGS. 26A to 26C, the current time is "11:20". The combining unit 152 newly receives reception data s41 from the stream data S. The combining unit 152 registers the key "Bob" and the numerical value "700" of the reception data s41 in WScur of the reception data table 141. As illustrated in FIG. 27B, the key "Bob" and the numerical value "700" are additionally registered in WScur. As illustrated in FIG. 27B, because WRprev and WRcur do not have the same key as the key "Bob" of the reception data s41, there are no combined results. Thus, data registered in the result set table 142 is the same as in FIG. 26C.

At the current time of "11:20", the timer TR indicates 40 minutes and corresponds to the window width WR. Hence, the receiving unit 151 outputs a window closing signal cr to the combining unit 152 and resets the timer TR to 0 minutes. The timer TS indicates 10 minutes.

Figure 28A:
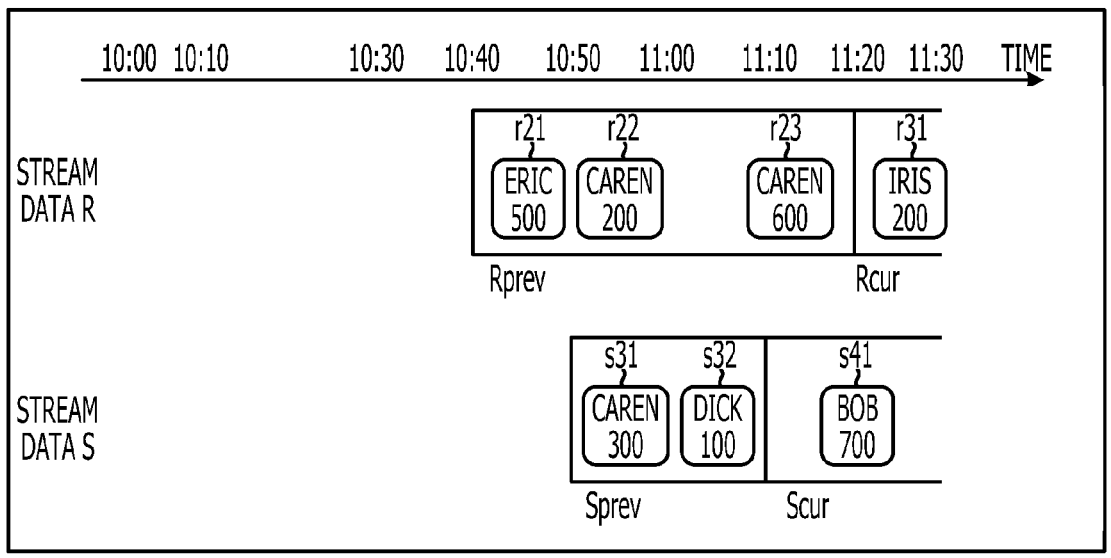
FIG. 28A is a diagram (46) illustrating processing of the combining unit.
Figure 28B:
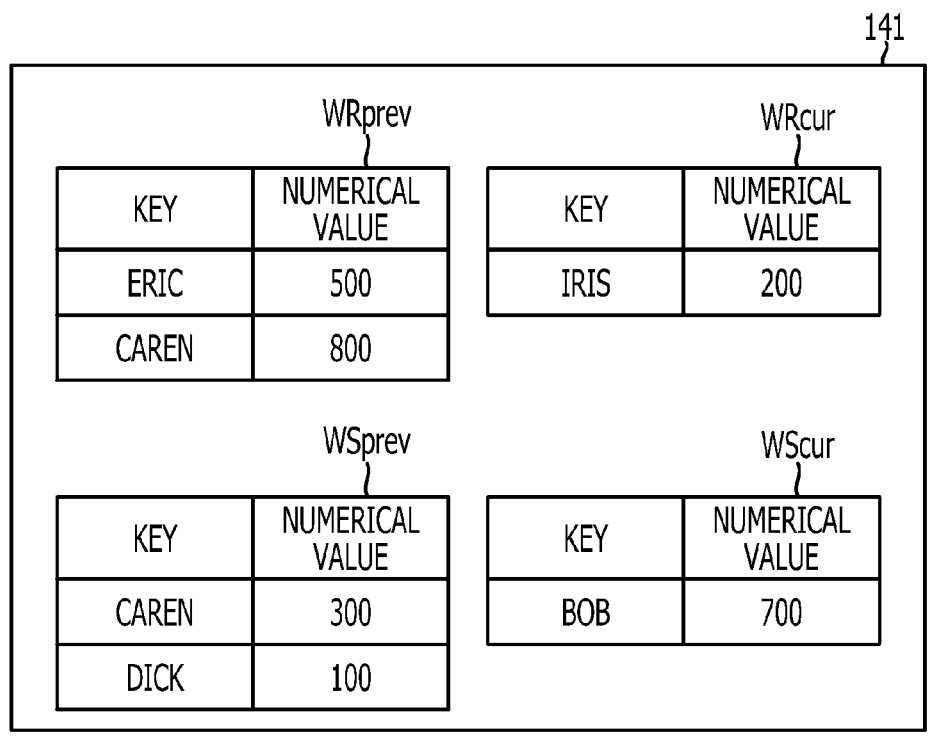
FIG. 28B is a diagram (47) illustrating processing of the combining unit.

FIGS. 28A and 28B will be described. Here the current time is "11:25". The combining unit 152 newly receives reception data r31 from the stream data R. The combining unit 152 registers the key "Iris" and the numerical value "200" of the reception data r31 in WRcur of the reception data table 141. As illustrated in FIG. 28B, the key "Iris" and the numerical value "200" are registered in WRcur. As illustrated in FIG. 28B, because WSprev and WScur do not have the same key as the key "Iris" of the reception data r31, there are no combined results. Thus, data registered in the result set table 142 is the same as in FIG. 26C.

The combining unit 152 performs the processing illustrated in FIGS. 11A to 28B and thereby stores a combined result of reception data r and reception data s of the stream data R and the stream data S in the result set table 142.

For example, as illustrated in FIGS. 14A to 14C, when the combining unit 152 detects, from the window Scur, the same key as a key in the window Rcur, the combining unit 152 stores information obtained by combining numerical values of the keys in the fourth storage area. As illustrated in FIGS. 18A and 18B, when the combining unit 152 detects, from the window Rcur, the same key as a key in the window Scur, the combining unit 152 stores information obtained by combining numerical values of the keys in the fourth storage area.

As illustrated in FIGS. 22A to 22C, when the combining unit 152 detects, from the window Scur, the same key as a key in the window Rcur, the combining unit 152 stores information obtained by combining numerical values of the keys in the fourth storage area.

When a window of the stream data R is switched to the next window, the combining unit 152 moves information in the second storage area to the first storage area, and treats the information in the first storage area as a combined result of both data in a window Rprev and data in a window Sprev. The combining unit 152 moves information in the fourth storage area to the third storage area. Thereby, a combined result of data in previous windows may be registered in the first storage area when the window of the stream data R is switched.

Conversely, when the window of the stream data S is switched to the next window, the combining unit 152 moves information in the third storage area to the first storage area and treats the information in the first storage area as a combined result of data in a window Rprev and data in a window Sprev. The combining unit 152 moves information in the fourth storage area to the second storage area. Thereby a combined result of data in previous windows may be registered in the first storage area when the window of the stream data S is switched.

The data transmitting unit 153 is a processing unit that transmits data stored in the result set table 142 to the user terminal 30 in response to a data request from the user terminal 30. For example, the data transmitting unit 153 may obtain a window closing signal from the receiving unit 151 and may sequentially transmit combined results stored in the first storage area of the result set table 142 to the user terminal 30 when the window closing signal is obtained.

Next, effects of the information processing device 100 according to the present embodiment will be described. When the information processing device 100 detects, from the stream data S, a piece of reception data with the same key as a key of a piece of reception data of the stream data R, while sequentially receiving windows for the stream data R and sequentially receiving windows for the stream data S from a start time, the information processing device 100 combines numerical values for the keys and stores the combined result in the result set table 142. Hence, when a window of a piece of stream data is switched to the next window, a combined result of data in previous windows has already been calculated, thereby suppressing delay in output of a result set of pieces of stream data.

As illustrated in FIGS. 25A to 25C, when "Caren" has already been registered in WRcur of the reception data table 141, the information processing device 100 does not compare the reception data r23 with data in WScur and WSprev. The information processing device 100 updates the total value in the second storage area by adding "600" to the total value in the second storage area. Thereby processing may be abbreviated and processing load may be reduced.

In the above-described embodiment, the processing of the information processing device 100 with fixed window widths WR and WS was described. However, the present embodiment is not limited to this. The window widths WR and WS may appropriately be modified to be any amount of time.

Figure 29:
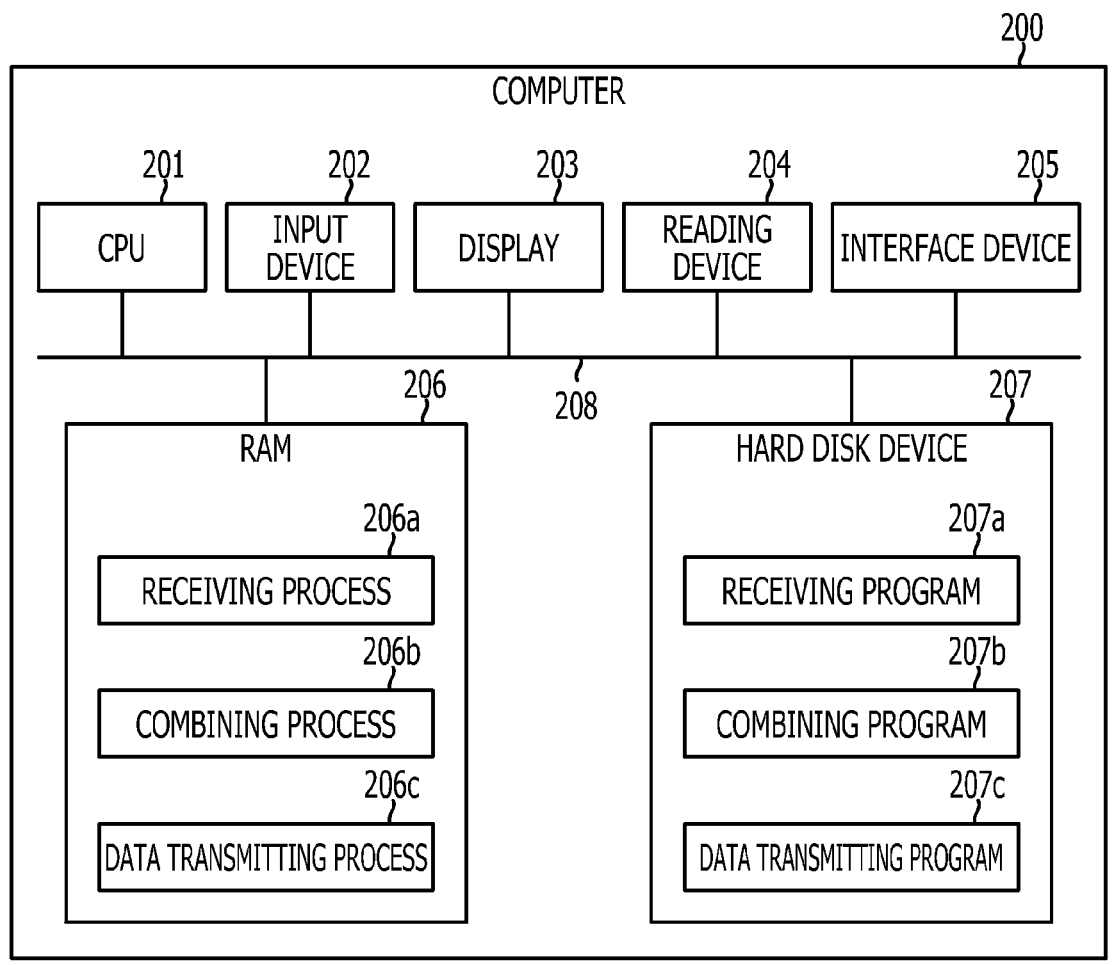
FIG. 29 illustrates an example of a computer that executes a combining program.
Figure 30:
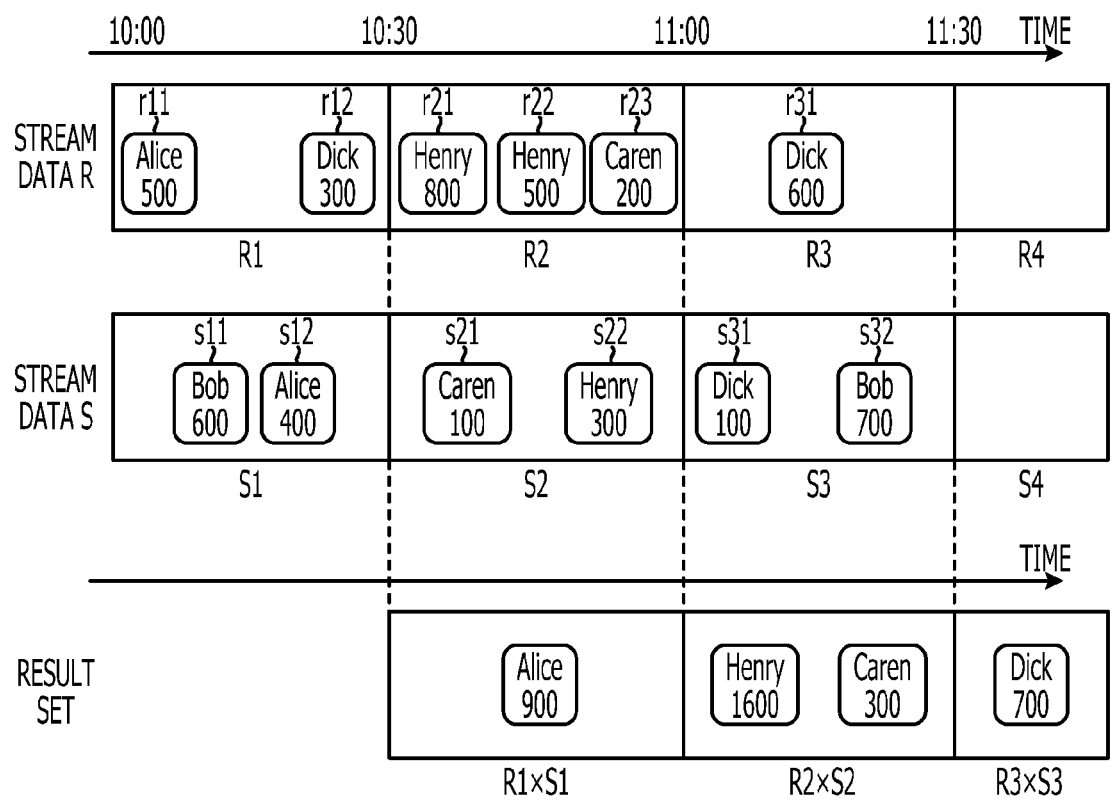
FIG. 30 illustrates related art.
Figure 31:
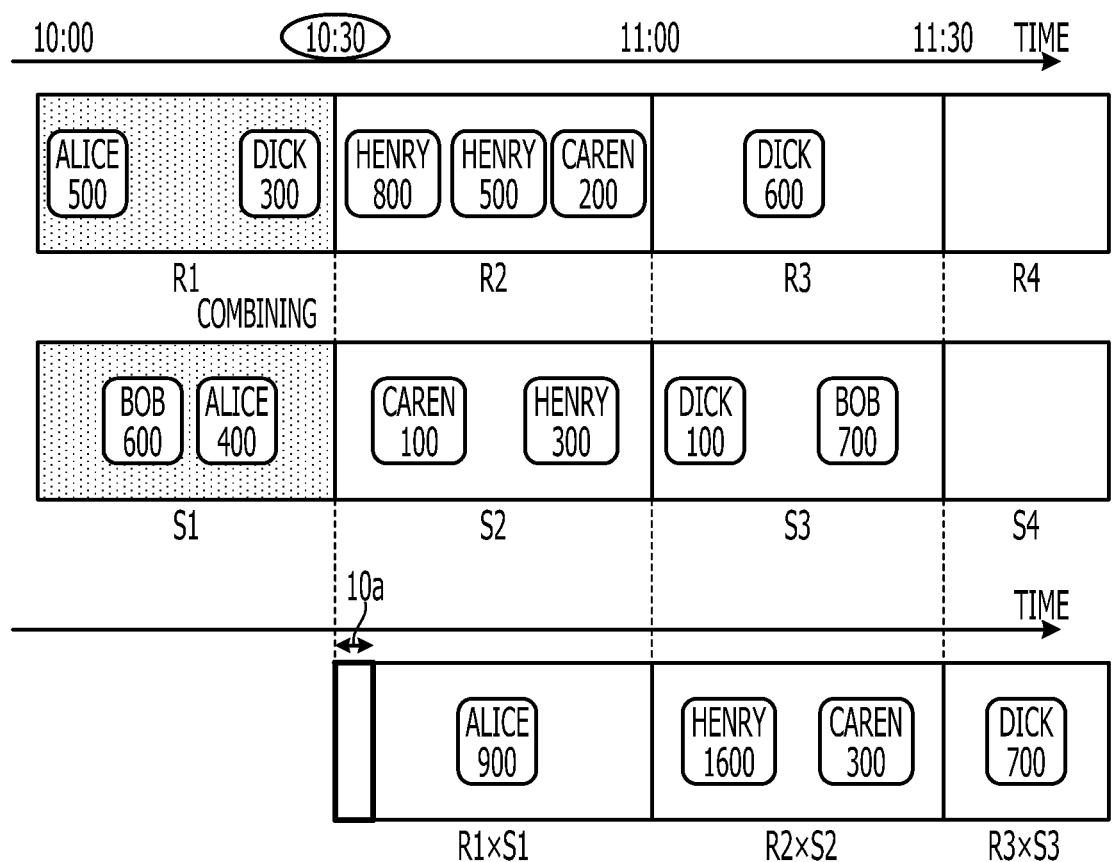
FIG. 31 illustrates a problem in the related art.

Next, an example of a computer that executes an information processing program that implements the same functions as those of the combining device 100 described in the present embodiment will be described. FIG. 29 illustrates an example of a computer that executes an information processing program.

As illustrated in FIG. 29, a computer 200 includes a CPU 201 that performs various types of arithmetic processing, an input device 202 that accepts data input from a user, and a display 203. The computer 200 includes a reading device 204 that reads a program or the like from a storage medium and an interface device 205 that transmits and receives data to and from another computer via a network. The computer 200 includes a RAM 206, which is an example of a memory that temporarily stores various pieces of information, and a hard disk device 207. The CPU 201, the input device 202, the display 203, the reading device 204, the interface device 205, the RAM 206, and the hard disk device 207 are coupled to a bus 208.

The hard disk device 207 stores, for example, a receiving program 207a, a combining program 207b, and a data transmitting program 207c. The CPU 201 reads the receiving program 207a, the combining program 207b, and the data transmitting program 207c and opens them in the RAM 206.

The receiving program 207a functions as a receiving process 206a. The combining program 207b functions as a combining process 206b. The data transmitting program 207c functions as a data transmitting process 206c.

For example, the receiving process 206a corresponds to the receiving unit 151, the combining process 206b corresponds to the combining unit 152, and the data transmitting process 206c corresponds to the data transmitting unit 153.

In some cases, the receiving program 207a, the combining program 207b, and the data transmitting program 207c are not initially stored in the hard disk device 207 from the beginning. For example, these programs are stored in a portable physical medium, which is inserted into the computer 200, such as a floppy disk (FD), a compact disc read only memory (CD-ROM), a digital versatile disk (DVD), a magnetic optical disk, or an integrated circuit (IC) card. The computer 200 may read the receiving program 207a, the combining program 207b, and the data transmitting program 207c from the portable physical medium and execute them.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
receive first stream data including a plurality of first keys and a numerical value corresponding to each of the plurality of first keys,
receive second stream data including a plurality of second keys and a numerical value corresponding to each of the plurality of second keys,
while receiving the first stream data and the second stream data and when a key included in the first stream data is the same as a key that has been detected from the second stream data, obtain a processing result by adding the numerical value corresponding to the key included in the first stream that is the same as the key that has been detected in the second stream to the numerical value corresponding to the key that has been detected in the second stream and output the obtained processing result, and
store the obtained processing result in the memory.

2. The information processing device according to claim 1,
wherein the memory includes a first storage area, a second storage area, a third storage area, and a fourth storage area, and
wherein the processor is configured to:
receive a second window subsequent to a first window of the first stream data and simultaneously receive a fourth window subsequent to a third window of the second stream data;
store data obtained by adding a numerical value included in the second window to a numerical value included in the third window in the second storage area when a key corresponding to the numerical value included in the second window matches with a key corresponding to the numerical value included in the third window in the second storage area;
store data obtained by adding the numerical value included in the second window to a numerical value included in the fourth window in the second storage area when the key corresponding to the numerical value included in the second window matches with a key corresponding to the numerical value included in the fourth window in the fourth storage area;
store data obtained by adding the numerical value included in the fourth window to a numerical value included in the first window in the second storage area when the key corresponding to the numerical value included in the second window matches with the key corresponding to the numerical value included in the fourth window in the third storage area;
store data stored in the second storage area in the first storage area and store data stored in the fourth storage area in the third storage area, when a window subsequent to the second window of the first stream data is received; and
store data stored in the third storage area in the first storage area and store data stored in the fourth storage area in the second storage area, when a window subsequent to the fourth window of the second stream data is received.

3. The information processing device according to claim 2,
wherein the processor is configured to:
add the numerical value for the key included in the second window to a numerical value for a key stored in the second storage area when the key included in the second window matches with the key stored in the second storage area; and
add the numerical value for the key included in the fourth window to a numerical value for a key stored in the third storage area when the key included in the fourth window matches with the key stored in the third storage area.

4. The information device according to claim 1,
wherein each of the plurality of first keys is received during one of a plurality of windows delimited by given intervals between a start time and an end time of the first stream data, and
each of the plurality of second keys is received during one of a plurality of windows delimited by given intervals between a start time and an end time of the second stream data.

5. A non-transitory computer-readable recording medium storing a program that causes a processor to execute an operation, the operation comprising:
- receiving first stream data including a plurality of first keys and a numerical value corresponding to each of the plurality of first keys;
- receiving second stream data including a plurality of second keys and a numerical value corresponding to each of the plurality of second keys;
- while receiving the first stream data and the second stream data and when a key included in the first stream data is the same as a key that has been detected from the second stream data, obtaining a processing result by adding the numerical value corresponding to the key included in the first stream that is the same as the key that has been detected in the second stream to the numerical value corresponding to the key that has been detected in the second stream and outputting the obtained processing result; and
- storing the obtained processing result in a memory.

6. The non-transitory computer-readable recording medium according to claim 5,
- wherein the memory includes a first storage area, a second storage area, a third storage area, and a fourth storage area,
- wherein the receiving includes:
  - receiving a second window subsequent to a first window of the first stream data and simultaneously receiving a fourth window subsequent to a third window of the second stream data,
- wherein the adding includes:
  - adding a numerical value included in the second window to a numerical value included in the third window in the second storage area when a key corresponding to the numerical value included in the second window matches with a key corresponding to the numerical value included in the third window in the second storage area;
  - adding the numerical value included in the second window to a numerical value included in the fourth window in the second storage area when the key corresponding to the numerical value included in the second window matches with a key corresponding to the numerical value included in the fourth window in the fourth storage area; and
  - adding the numerical value included in the fourth window to a numerical value included in the first window in the second storage area when the key corresponding to the numerical value included in the second window matches with the key corresponding to the numerical value included in the fourth window in the third storage area, and
- wherein the storing includes:
  - storing data stored in the second storage area in the first storage area and storing data stored in the fourth storage area in the third storage area, when a window subsequent to the second window of the first stream data is received; and
  - storing data stored in the third storage area in the first storage area and storing data stored in the fourth storage area in the second storage area, when a window subsequent to the fourth window of the second stream data is received.

7. The non-transitory computer-readable recording medium according to claim 6,
- wherein the adding includes:
  - adding the numerical value for the key included in the second window to a numerical value for a key stored in the second storage area when the key included in the second window matches with the key stored in the second storage area; and
  - adding the numerical value for the key included in the fourth window to a numerical value for a key stored in the third storage area when the key included in the fourth window matches with the key stored in the third storage area.

8. An information processing method executed by an information processing device, the information processing method comprising:
- receiving first stream data including a plurality of first keys and a numerical value corresponding to each of the plurality of first keys;
- receiving second stream data including a plurality of second keys and a numerical value corresponding to each of the plurality of second keys;
- while receiving the first stream data and the second stream data and when a key included in the first stream data is the same as a key that has been detected from the second stream data, obtaining a processing result by adding the numerical value corresponding to the key included in the first stream that is the same as the key that has been detected in the second stream to the numerical value corresponding to the key that has been detected in the second stream and outputting the obtained processing result; and
- storing the obtained processing result in a memory.

9. The information processing method according to claim 8,
- wherein the memory includes a first storage area, a second storage area, a third storage area, and a fourth storage area,
- wherein the receiving includes:
  - receiving a second window subsequent to a first window of the first stream data and simultaneously receiving a fourth window subsequent to a third window of the second stream data,
- wherein the adding includes:
  - adding a numerical value included in the second window to a numerical value included in the third window in the second storage area when a key corresponding to the numerical value included in the second window matches with a key corresponding to the numerical value included in the third window in the second storage area;
  - adding the numerical value included in the second window to a numerical value included in the fourth window in the second storage area when the key corresponding to the numerical value included in the second window matches with a key corresponding to the numerical value included in the fourth window in the fourth storage area; and
  - adding the numerical value included in the fourth window to a numerical value included in the first window in the second storage area when the key corresponding to the numerical value included in the second window matches with the key corresponding to the numerical value included in the fourth window in the third storage area, and
- wherein the storing includes:
  - storing data stored in the second storage area in the first storage area and storing data stored in the fourth storage area in the third storage area, when a window subsequent to the second window of the first stream data is received; and storing data stored in the third storage area in the first storage area and storing data stored in the fourth storage area in the second storage area, when a window subsequent to the fourth window of the second stream data is received.

10. The information processing method according to claim 9, wherein the adding includes:

adding the numerical value for the key included in the second window to a numerical value for a key stored in the second storage area when the key included in the second window matches with the key stored in the second storage area; and adding the numerical value for the key included in the fourth window to a numerical value for a key stored in the third storage area when the key included in the fourth window matches with the key stored in the third storage area.

\* \* \* \* \*